(12) United States Patent
Ueda et al.

(10) Patent No.: US 8,421,882 B2
(45) Date of Patent: Apr. 16, 2013

(54) IMAGING APPARATUS AND IMAGING CONTROL METHOD

(75) Inventors: Atsushi Ueda, Hyogo (JP); Jun Minakuti, Osaka (JP)

(73) Assignee: Sony Corporation, Tokyo (JP)

( * ) Notice: Subject to any disclaimer, the term of this patent is extended or adjusted under 35 U.S.C. 154(b) by 455 days.

(21) Appl. No.: 12/763,456

(22) Filed: Apr. 20, 2010

(65) Prior Publication Data

US 2010/0309332 A1 Dec. 9, 2010

(30) Foreign Application Priority Data

Jun. 3, 2009 (JP) ................. 2009-134151
Jul. 29, 2009 (JP) ................. 2009-176202

(51) Int. Cl.
*H04N 5/235* (2006.01)
(52) U.S. Cl.
USPC .................... 348/229.1; 348/221.1
(58) Field of Classification Search .......... None
See application file for complete search history.

(56) References Cited

U.S. PATENT DOCUMENTS

| | | | |
|---|---|---|---|
| 7,667,764 B2 * | 2/2010 | Kamon et al. | 348/364 |
| 7,920,175 B2 * | 4/2011 | Kawarada | 348/226.1 |
| 8,130,280 B2 * | 3/2012 | Imafuji et al. | 348/222.1 |
| 2009/0021606 A1 | 1/2009 | Kuruma et al. | |
| 2009/0167905 A1 | 7/2009 | Ishibashi et al. | |
| 2010/0073516 A1 | 3/2010 | Minakuti et al. | |
| 2010/0079616 A1 | 4/2010 | Minakuti et al. | |
| 2010/0157078 A1 * | 6/2010 | Atanassov et al. | 348/222.1 |
| 2010/0259626 A1 * | 10/2010 | Savidge | 348/208.4 |

FOREIGN PATENT DOCUMENTS

JP 2008-271368 11/2008

* cited by examiner

*Primary Examiner* — Luong T Nguyen
(74) *Attorney, Agent, or Firm* — Oblon, Spivak, McClelland, Maier & Neustadt, L.L.P.

(57) ABSTRACT

In an imaging apparatus, an imaging unit generates an acquired image of a subject. A luminance information acquirer acquires the subject's luminance information. A detector detects the subject's luminance range on the basis of the acquired luminance information. An imaging controller sets a range of exposure control values having a step that corresponds to a value obtained by multiplying the detected luminance range by a predetermined coefficient k (where 0<k<1), and then uses the imaging unit to take multiple shots (i.e., multiple imagings) set with respectively different exposure control values within the range of exposure control values. An image compositor generates a composite image by compositing image portions extracted from the plurality of images obtained via the multiple shots. When just one shot is taken, the single exposure control value set for the one shot is contained within the range of the exposure control values.

12 Claims, 10 Drawing Sheets

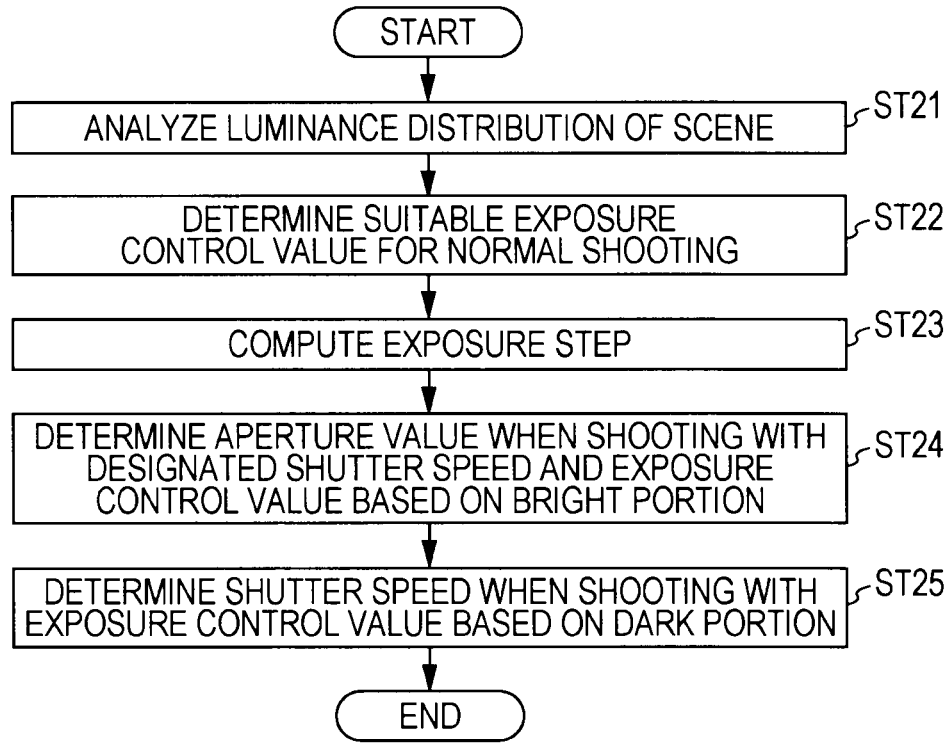
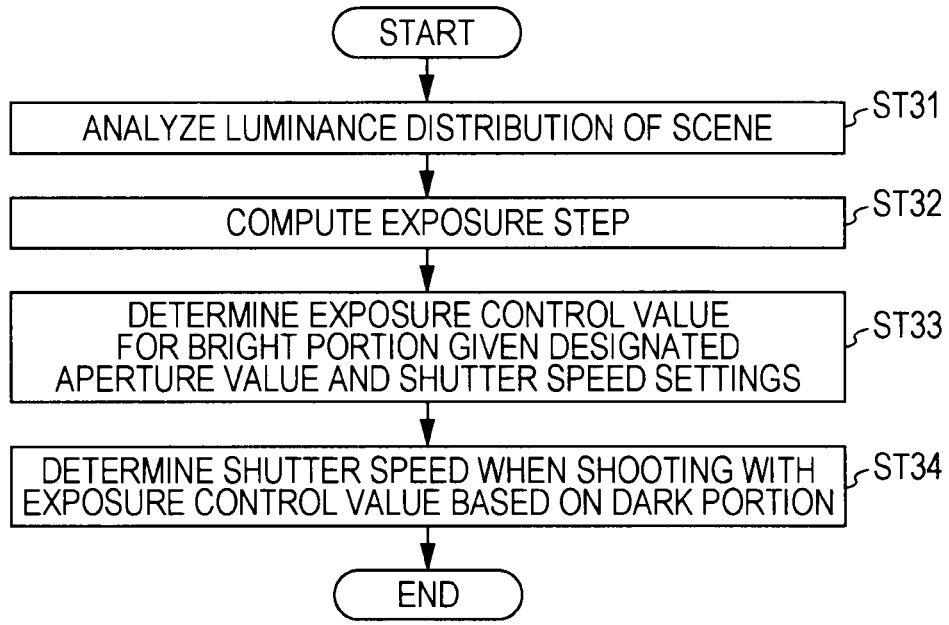

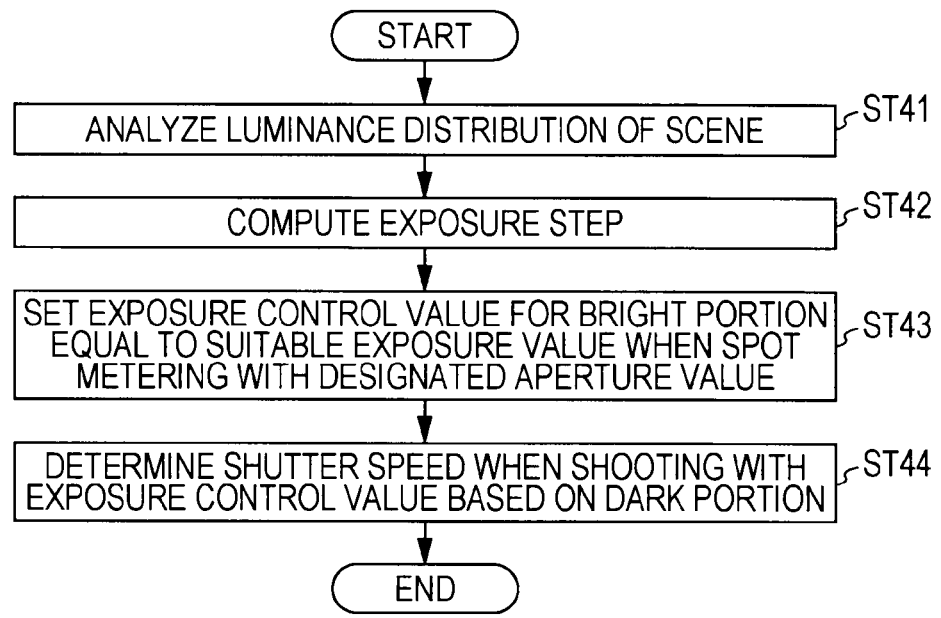
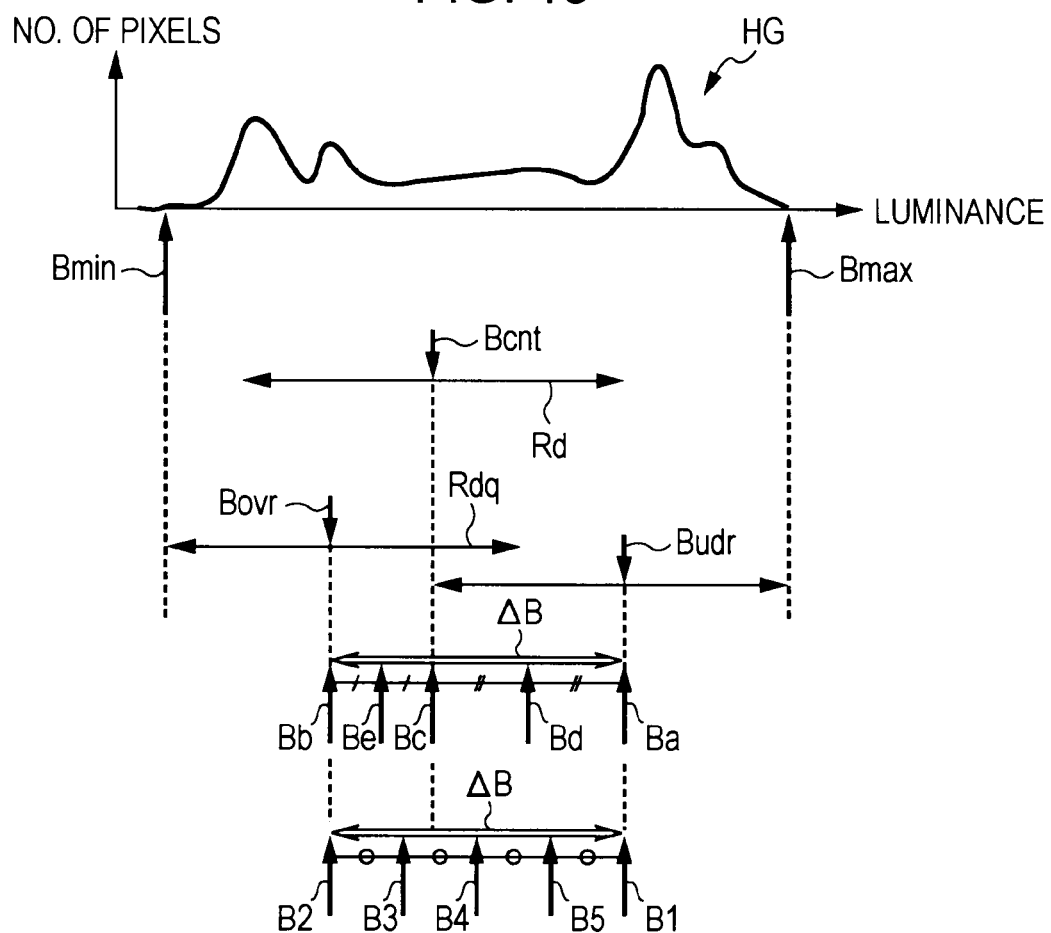

IMAGING APPARATUS AND IMAGING CONTROL METHOD

BACKGROUND OF THE INVENTION

1. Field of the Invention

The present invention relates to an imaging apparatus provided with an imaging unit that generates an acquired image of a subject.

2. Description of the Related Art

When a digital camera or similar imaging apparatus is used to shoot a scene with high contrast (such as backlit shooting, or simultaneously shooting indoors and outdoors), loss of detail may occur due to insufficient dynamic range of the imaging element. In other words, the bright portions of the image may become saturated and blown out (i.e., overexposed), while the dark portions may become blocked up (i.e., underexposed). Such loss of detail can occur even when exposure control is performed.

Technology for alleviating the above defect has been disclosed, wherein an imaging apparatus generates a high dynamic range composite image by compositing a long-exposure image and a short-exposure image obtained by shooting twice with different exposure time settings (see Japanese Unexamined Patent Application Publication No. 2008-271368, for example). The imaging apparatus is configured to suppress overexposure by first detecting overexposure from the luminance histogram of the composite image, and then determining the short-exposure time such that overexposure does not occur.

SUMMARY OF THE INVENTION

However, although the short-exposure time is automatically adjusted in the imaging apparatus disclosed in the above JP-A-2008-271368, the adjustment might not suitably reflect the contrast in the scene. If, for example, the imaging apparatus were configured to determine the luminance range (i.e., the difference between the maximum and minimum luminance) of the subject, and then set different exposure times according to the luminance range, then it would be possible effectively utilize the dynamic range of the imaging element (i.e., the imaging means) and generate a favorable composite image.

In light of the foregoing problem, it is desirable to provide technology for an imaging apparatus able to effectively utilize the dynamic range of the imaging means and generate a favorable composite image by taking multiple shots that suitably reflect the luminance range of the subject.

An imaging apparatus in accordance with an embodiment of the present invention includes: an imaging unit configured to receive subject light passing through imaging optics having an aperture mechanism, and generate an acquired image corresponding to the subject; a luminance information acquirer configured to meter a predetermined light meter area and acquire luminance information regarding the subject; a detector configured to detect the luminance range of the subject on the basis of high-intensity luminance information and low-intensity luminance information acquired by the luminance information acquirer; an imaging controller configured to set a range of exposure control values having a step that corresponds to a value obtained by multiplying the luminance range detected by the detector by a predetermined coefficient k (where 0<k<1), and then use the imaging unit to take multiple shots (i.e., multiple imagings) set with respectively different exposure control values within the range of exposure control values; and an image compositor configured to generate a composite image by compositing image portions extracted from the plurality of images obtained as a result of the imaging unit taking the multiple shots. When just one shot is taken, the single exposure control value set for the one shot is contained within the range of the exposure control values.

According to an embodiment of the present invention, the luminance range in accordance with a subject is detected, and the range of exposure control values is set having steps that correspond to the value obtained by multiplying the luminance range by a predetermined coefficient k (where 0<k<1). An imaging unit or similar means is then used to take multiple shots set at respectively different exposure control values within the range of exposure control values. Image portions extracted from the plurality of images obtained by taking multiple shots are then composited to generate a composite image. Herein, when just one shot is taken, the single exposure control value set for the one shot is contained within the range of the exposure control values. As a result, the dynamic range of the imaging means is effectively utilized, and a favorable composite image is generated by taking multiple shots that suitably reflect the luminance range of the subject.

BRIEF DESCRIPTION OF THE DRAWINGS

FIG. 10 is a flowchart illustrating the basic operation of an imaging apparatus in accordance with a third embodiment of the present invention;

FIG. 11 is a flowchart illustrating the basic operation of an imaging apparatus in accordance with a fourth embodiment of the present invention;

FIG. 12 is a flowchart illustrating the basic operation of an imaging apparatus in accordance with a fifth embodiment of the present invention;

FIG. 13 is a diagram for explaining the operation of an imaging apparatus in accordance with a sixth embodiment of the present invention;

DESCRIPTION OF THE PREFERRED EMBODIMENTS

<First Embodiment>
[Primary Configuration of Imaging Apparatus]

Figure 1:
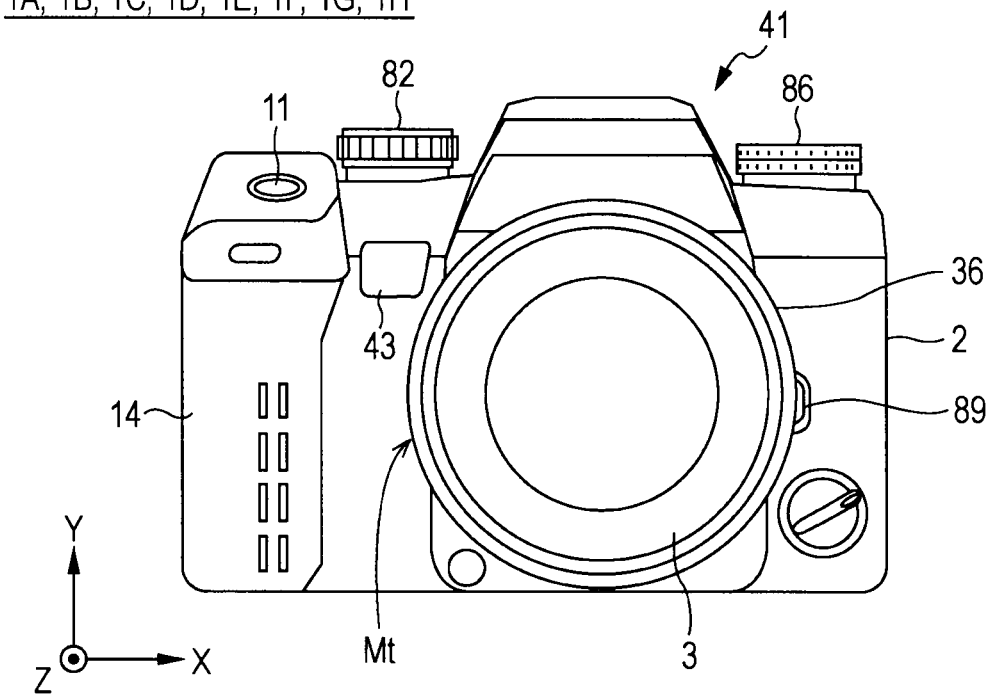
FIG. 1 illustrates the external configuration of an imaging apparatus in accordance with a first embodiment of the present invention.
Figure 2:
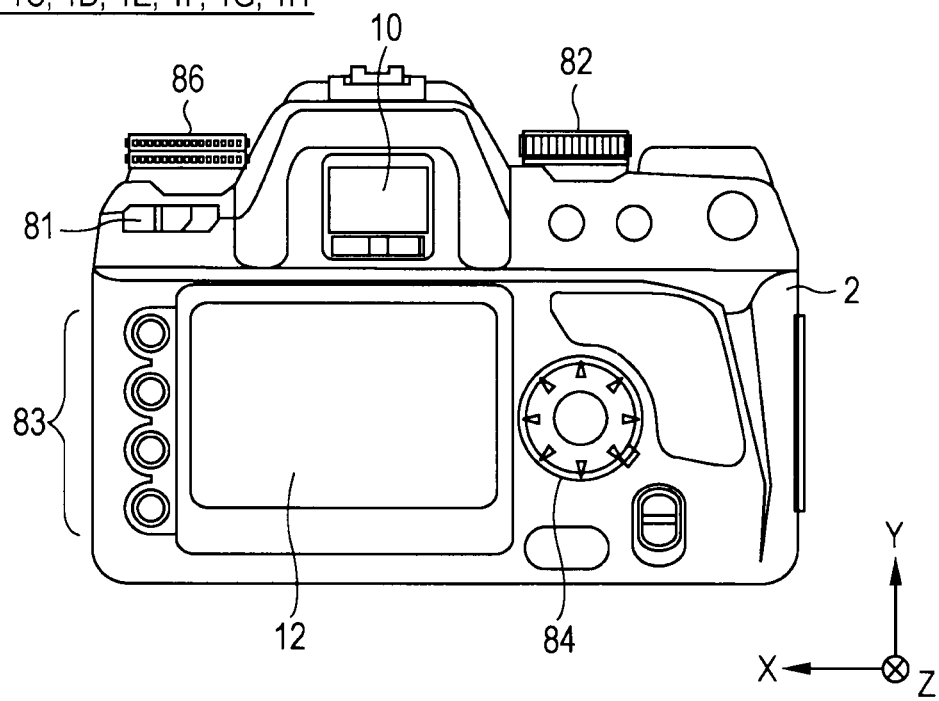
FIG. 2 illustrates the external configuration of an imaging apparatus in accordance with the first embodiment.

FIGS. 1 and 2 illustrate the external configuration of an imaging apparatus 1A in accordance with a first embodiment of the present invention. FIG. 1 is a front exterior view of the imaging apparatus 1A, while FIG. 2 is a rear exterior view of the imaging apparatus 1A. The imaging apparatus 1A herein is configured as a lens-interchangeable, digital single-lens reflex (DSLR) camera.

As shown in FIG. 1, the imaging apparatus 1A is provided with a camera body 2. The interchangeable lens 3, an interchangeable photographic lens unit, is freely attachable to and detachable from the camera body 2.

The interchangeable lens 3 primarily includes a lens tube 36, as well as a lens group 37 (see FIG. 3) and an aperture 38 (see FIG. 3) provided inside the lens tube 36. The lens group 37 acts as the imaging optics, and includes lenses such as a focus lens for adjusting the focal point by moving along the optical axis.

In approximately the center of the front side of the camera body 2, there is provided a circular mount Mt, into which the interchangeable lens 3 is fitted. An attach button 89 for attaching and detaching the interchangeable lens 3 is provided near the circular mount Mt.

In addition, an exposure mode dial 82 is provided on the upper-left side of the front of the camera body 2, while a control value dial 86 is provided on the upper-right side of the front of the camera body 2. By operating the exposure mode dial 82, it is possible to select from various modes, such as a Program Exposure mode, an Aperture Priority mode, a Shutter Speed Priority mode, a Manual Exposure mode, and a Scene Selector mode, to be hereinafter described. Also, by operating the control value dial 86, it is possible to set control values in the exposure modes, for example. For example, by means of the control value dial 86, an aperture value for the aperture 38 or a shutter speed (i.e., exposure time) for the imaging element 5 (see FIG. 3) can be specified on the basis of user input.

In addition, a grip 14 for the user to hold is provided at the right edge on the front of the camera body 2. On top of the grip 14, there is provided a release button 11 for issuing instructions to start exposure. Inside the grip 14, there is provided a battery chamber and a card chamber. The battery chamber houses a power source for the camera. The power source may be a secondary battery, such as a nickel-metal hydride rechargeable battery, or a primary battery, such as an alkaline battery. The card chamber is configured to removably house a memory card 90 (see FIG. 3) for recording the image data of shot images.

The release button 11 is a two-stage button able to detect two states: a half-press state (state S1), and a full-press state (state S2). When the release button 11 is pressed halfway and enters state S1, the imaging apparatus 1A conducts preparatory operations (such as AF and AE control operations, for example) for acquiring a recorded still image of the subject (i.e., the primary image). When the release button 11 is pressed farther and enters state S2, the imaging apparatus 1A conducts shooting operations to acquire the primary image. (In other words, a series of operations is performed, wherein the imaging element 5 (FIG. 3) is used to expose the subject (more specifically, the image of light reflected off the subject), and then predetermined image processing is performed with respect to the image signal obtained as a result of the exposure.)

In FIG. 2, a viewfinder window 10 is provided on the upper side of the approximate center of the back of the camera body 2. By looking into the viewfinder window 10, the user is able to view subject light led from the interchangeable lens 3 and compose a shot.

In FIG. 2, in approximately the center of the back of the camera body 2, there is provided a rear display 12. The rear display 12 may be realized by means of a color liquid crystal display (LCD), for example. The rear display 12 is able to display menu screens for setting options such as shooting parameters. In addition, while in Playback mode, the rear display 12 is able to play back (i.e., display) shot images that have been recorded onto the memory card 90. The rear display 12 is also able to display a live view (i.e., preview) showing a video of the subject. The live view is displayed on the basis of image signals successively generated by the imaging element 5 prior to actual shooting (i.e., the shooting performed in order to record an image). The live view enables the user to view the subject to be shot by the imaging element 5. The Live View mode wherein the above live view display is executed by the rear display 12 is set by the master controller 101A (see FIG. 3).

To the upper-left of the rear display 12, there is provided a main switch 81. The main switch 81 is a two-point sliding switch. When the switch contact is set to the OFF position on the left side, device power is switched off. When the switch contact is set to the ON position on the right side, device power is switched on.

On the right side of the rear display 12, there is provided a directional key 84. The directional key 84 is a circular button configured to respectively detect four-way directional presses up, down, left, and right, as well as four-way diagonal presses up-right, up-left, down-right, and down-left. Herein, the directional key 84 is also configured to detect the pressing of a central push button separate from the above eight directional presses.

On the left side of the rear display 12, there is provided a settings button group 83, which includes a plurality of buttons for performing actions such as specifying menu screen settings and deleting images, for example.

Figure 3:
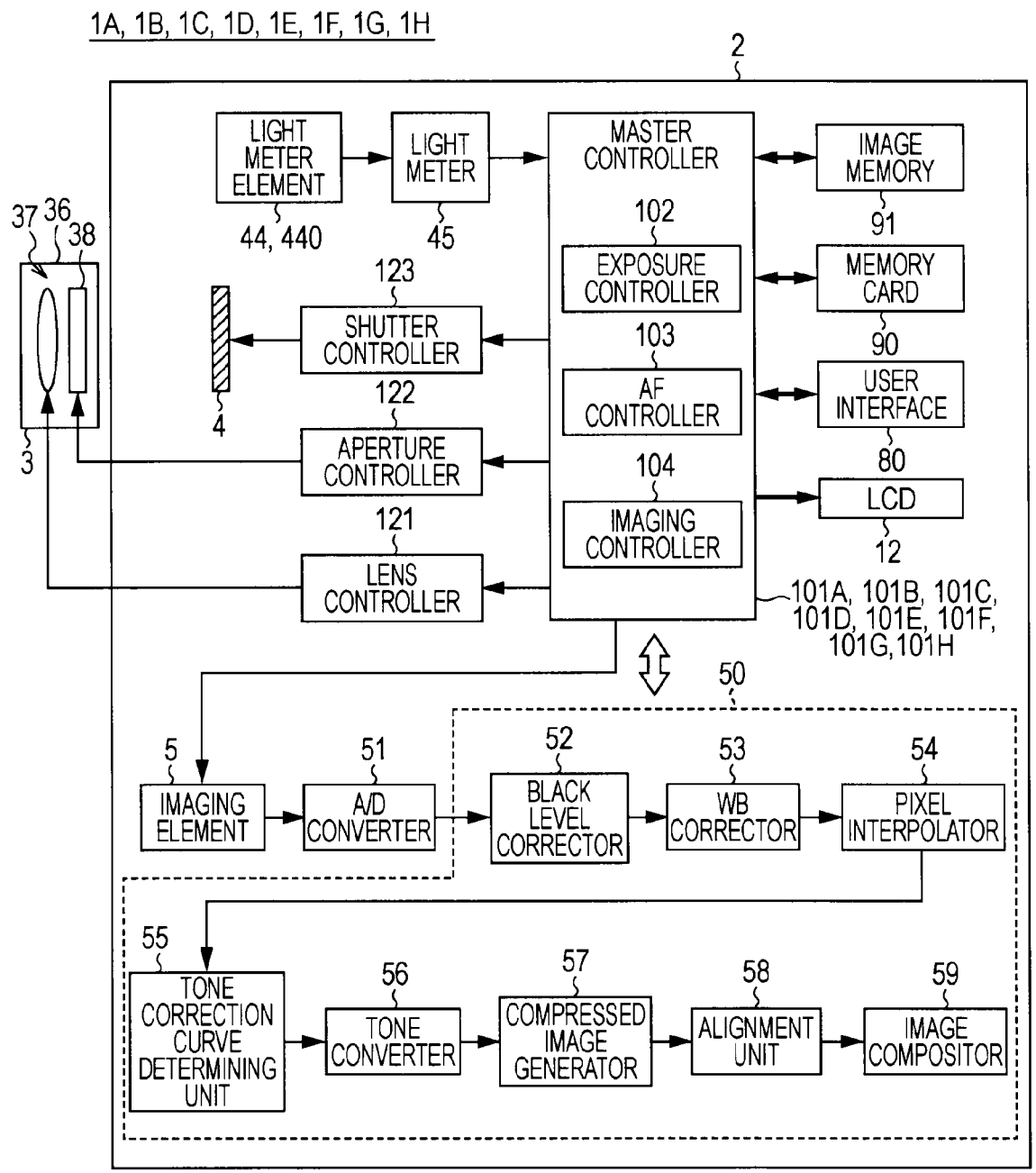
FIG. 3 is a block diagram illustrating the functional configuration of an imaging apparatus.

An overview of the functions of the imaging apparatus 1A will now be given, with reference to FIG. 3. FIG. 3 is a block diagram illustrating the functional configuration of the imaging apparatus 1A.

As shown in FIG. 3, the imaging apparatus 1A is provided with a user interface 80, a master controller 101A, a lens controller 121, an aperture controller 122, a shutter controller 123, and an image processor 50.

The user interface 80 includes various buttons, switches, and similar elements, including the release button 11 (see FIG. 1). In response to input operations made by the user with respect to the user interface 80, the master controller 101A realizes various operations.

Figure 4:
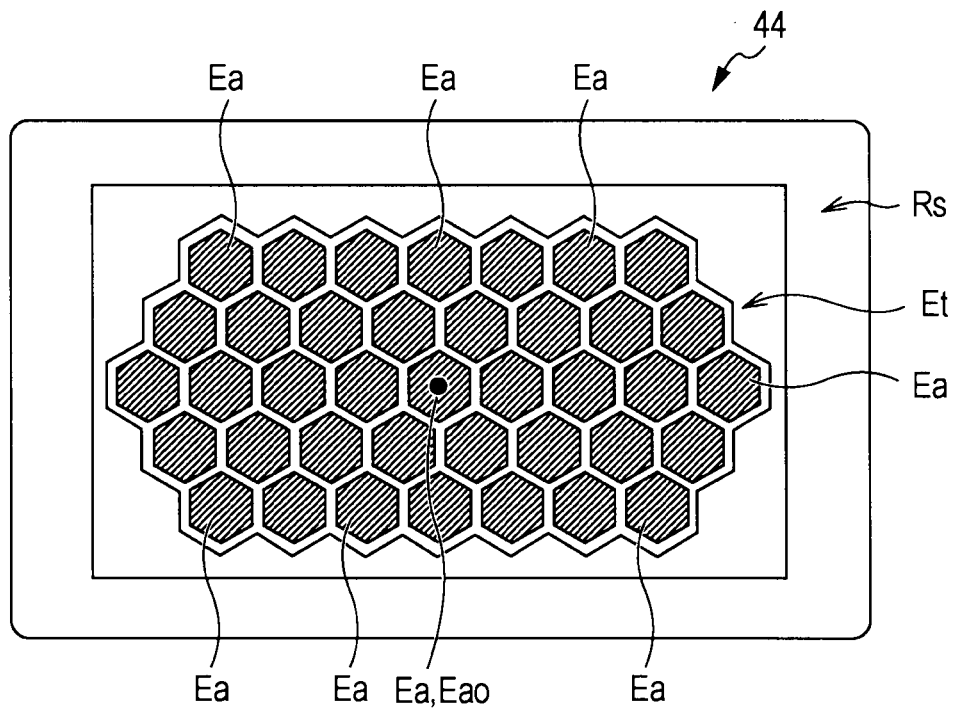
FIG. 4 is a diagram for explaining the configuration of a light meter element.

The light meter element 44 is a sensor provided in the optical viewfinder, for example. The light meter element 44 receives a light beam passing through the interchangeable lens 3, and detects the luminance of the subject. As shown in FIG. 4, in the light meter element 44 there is established a light meter area Et. The light meter area Et is made up of a plurality of individual light meter zones Ea arranged in a honeycomb structure within the imaging area Rs of the imaging element 5. The light meter element 44 is configured such that luminance information regarding the subject is detected individually in each light meter zone Ea. In other words, by means of the light meter element 44, the light meter area Et can be photometrically measured, and luminance information regarding the subject can be acquired.

On the basis the luminance information from the light meter element 44, the light meter 45 generates light meter data for the subject. By means of the light meter 45, the maximum luminance information (i.e., high-intensity luminance information) and the minimum luminance information (i.e., low-intensity luminance information) acquired by the light meter element 44 can be used as a basis for detecting the luminance range with respect to the subject, as described hereinafter. Subsequently, the light meter data generated by the light meter 45 is input into the exposure controller 102, and a suitable exposure control value for the subject is computed.

Using the above light meter element 44 and light meter 45, a metering mode from among the following three light meter modes can be selected in the imaging apparatus 1A: a Multi-Segment Metering mode, a Center-Weighted Metering mode, and a Spot Metering mode. Herein, the Multi-Segment Metering mode involves independently measuring each light meter zone Ea in the light meter area Et shown in FIG. 4. In the Multi-Segment Metering mode, suitable luminance values may also be computed by using distance information in addition to the luminance information for the subject given by the light meter zones Ea. The Center-Weighted Metering mode involves computing suitable luminance values by conducting weighted measurement of the central portion of the imaging screen, with weights increasing in the direction of the center light meter zone Eao. Meanwhile, the Spot Metering mode involves computing suitable luminance values by spot-measuring just the center light meter zone Eao (see FIG. 4). In other words, in Spot Metering mode, measurement is concentrated on the specific spot zone Eao within the light meter area Et shown in FIG. 4.

The master controller 101A may be realized by means of a microprocessor, for example, and is primarily provided with components such as a CPU, RAM, and ROM.

The master controller 101A realizes various functions in software by reading out a program stored in the ROM, and then executing the program with the CPU. For example, the master controller 101A includes an exposure controller 102, an AF controller 103, and an imaging controller 104, each realized in software.

The exposure controller 102 determines exposure control values by means of predetermined exposure computations. Exposure control values are computed from the exposure mode or other settings information, as well as from the light meter data obtained by the light meter 45 on the basis of the output from the light meter element 44 when subject light is incident thereon. In addition, the exposure controller 102 determines respective exposure control values (i.e., shutter speeds and aperture values) when taking multiple shots for the image compositing to be hereinafter described.

Figure 5:
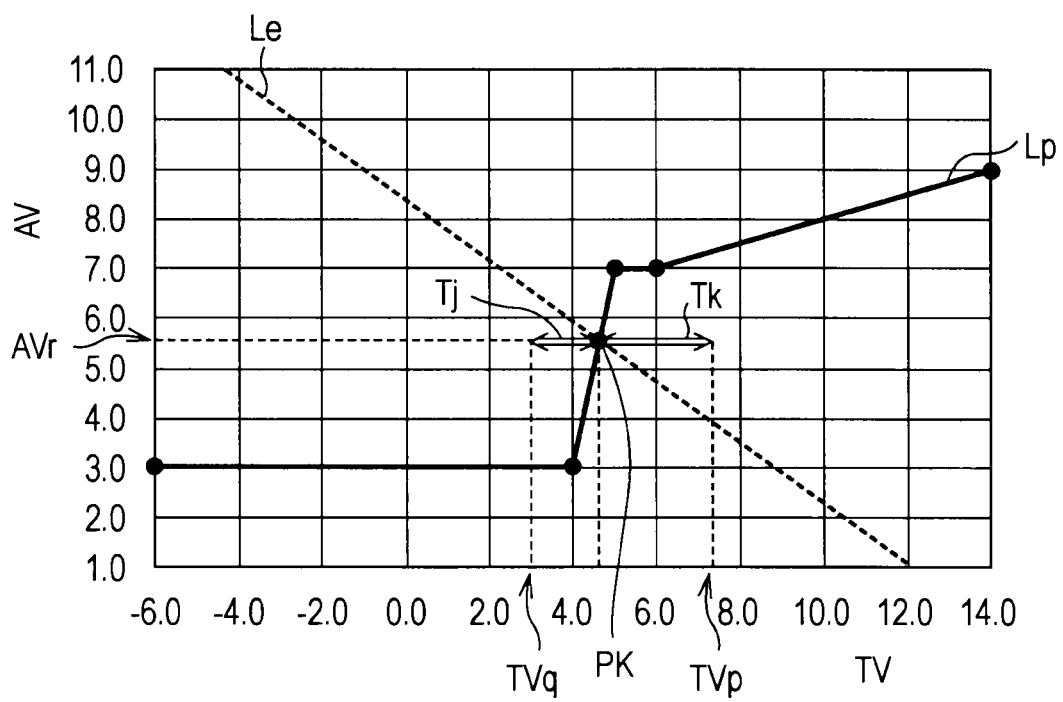
FIG. 5 illustrates an exemplary program line chart.

Also, by means of the exposure controller 102, it is possible to select one of the following five exposure modes: a Program Exposure mode, a Scene Selector mode, an Aperture Priority mode, a Shutter Speed Priority mode, and a Manual Exposure mode. Herein, the Program Exposure mode (also referred to as the P mode) is an exposure mode wherein a suitable exposure value is derived on the basis of a program line chart like that shown by way of example in FIG. 5. The program line chart defines the relationship between the shutter speed TV (where $TV=\log_2(1/T)$, and T is the shutter speed in seconds), and the aperture AV. In the Scene Selector mode, there are prepared a plurality of program line charts (see FIG. 5) defining both the shutter speed and the aperture, similarly to the above Program Exposure mode. The plurality of program line charts are prepared for different types of scenes, such as portraits and landscapes. A suitable exposure is then obtained by determining a combination of an aperture value and a shutter speed from a program line chart suited to the current scene. In the Aperture Priority mode (also referred to as the A mode), a suitable exposure is obtained by automatically determining the shutter speed according to an aperture value that has been set by the user. Likewise, in the Shutter Speed Priority mode (also referred to as the S mode), a suitable exposure is obtained by automatically determining the aperture value according to a shutter speed that has been set by the user. Manual Exposure mode enables the user to shoot at a desired exposure value using arbitrarily set values for the shutter speed and aperture value.

The AF controller 103 may, for example, include a phase detection AF module (not shown) for receiving subject light and detecting focus using phase detection techniques (i.e., phase detection AF). Using the phase detection AF module, the AF controller 103 detects the amount of in-plane misalignment off the focused position (i.e., the amount of defocus) from the interval between two subject images. Such defocus detection is conducted in each of a plurality of AF areas set in the subject imaging area. The defocus amount from one of the AF areas is then appropriately selected, and the focus lens is driven to the focus target position.

When shooting a scene with comparatively high contrast, for example, the imaging controller 104 acquires a plurality of shot images to be used as the foundation of a composite image. For this reason, the imaging controller 104 takes multiple shots with respectively different exposure control value settings (later described in detail).

The lens controller 121 causes the focus lens and the zoom lens contained in the lens group 37 of the interchangeable lens 3 to be moved by controlling the driving of an actuator or similar motor. The lens controller 121 conducts the drive control by generating control signals on the basis of input signals from the master controller 101A. In so doing, it becomes possible to modify the AF control or the focal length (i.e., the zoom factor).

The aperture controller 122 modifies the aperture diameter of the aperture 38 that acts as the aperture mechanism by controlling the driving of an actuator or similar motor. The aperture controller 122 conducts the drive control by generating control signals on the basis of input signals from the master controller 101A.

The shutter controller 123 controls the opening and closing of the shutter 4 by controlling the driving of an actuator or similar motor. The shutter controller 123 conducts the drive control by generating control signals on the basis of input signals from the master controller 101A.

The imaging element 5 includes a plurality of photodiode-containing pixels, for example, arranged in a two-dimensional matrix. A CMOS color area sensor is used for the photo-sensitive surface of each pixel. The CMOS color area sensor has a 1:2:1 Bayer mosaic of red (R), green (G), and blue (B) color filters, for example, with each filter exhibiting respectively different spectral characteristics. In the imaging element 5 configured as above, subject light is converted into an electrical signal by photoelectric action, and an image signal corresponding to the primary image (i.e., the image signal used for image recording) is generated. In other words, the imaging element 5 receives subject light passing through the interchangeable lens 3, and generates an acquired image corresponding to the subject.

In response to drive control signals (i.e., charge accumulation start and stop signals) input from the master controller 101A via a timing control circuit (not shown), a subject image focused onto the photo-sensitive surface of the imaging element 5 is exposed (i.e., charge is accumulated by photoelectric conversion), and an image signal corresponding to the subject image is generated. Additionally, in response to readout control signals input from the master controller 101A via the timing control circuit, the imaging element 5 outputs the image signal to the A/D converter 51.

The image signal that was acquired by the imaging element 5 is converted into a digital signal by the A/D converter 51, and then input into the image processor 50.

The image processor 50 digitally processes the image data input from the A/D converter 51, and generates image data corresponding to the acquired image. The image processor 50 herein is provided with a black level corrector 52, a white balance (WB) corrector 53, a pixel interpolator 54, a tone correction curve determining unit 55, a tone converter 56, and a compressed image generator 57.

The black level corrector 52 sets the deepest part of the image signal to a reference black level.

The WB corrector 53 converts the per-color levels of the RGB pixel data in order to correct color imbalances due to the color temperature of the light source used for shooting.

The pixel interpolator 54 interpolates the missing color pixels that occur in the color filters of the imaging element 5 as a result of the Bayer mosaic pattern described earlier.

The tone correction curve determining unit 55 and the tone converter 56 determine the optimal correction curve (i.e., a gamma correction curve) for the acquired image, while also using the correction curve to conduct tone correction with respect to the image data (i.e., the RGB data).

The compressed image generator 57 performs compression processing, such as JPEG, for example, with respect to the processed image data, and stores the result as image data for recording in the image memory 91.

The image processor 50 is also provided with an alignment unit 58 and an image compositor 59.

The alignment unit 58 takes plurality of acquired images have been consecutively imaged by the imaging element 5 and stored in the image memory 91, and aligns the plurality of acquired images for subsequent image compositing. In the alignment unit 58 herein, misalignments among images are detected from shake information of the imaging apparatus 1A, for example, and alignment is then executed on the basis of the detected misalignments.

The image compositor 59 takes a plurality of images that have been aligned by the alignment unit 58, and composites the plurality of images in order to suitably expand the dynamic range of the resulting composite image, as described hereinafter. In other words, the image compositor 59 composites image portions extracted from a plurality of acquired images obtained by taking multiple shots with the imaging element 5, and generates a composite image wherein both overexposure and underexposure has been suppressed. Subsequently, the composite image thus generated is recorded onto the memory card 90 via the master controller 101A.

When shooting a subject with high contrast in the imaging apparatus 1A configured as above, a plurality of images are consecutively shot at different exposure control values and then composited together. In so doing, it is possible to obtain a high dynamic range subject image. The above shooting of images at different exposure control values will now be described in detail.

[Shooting at Different Exposure Control Values]

In the imaging apparatus 1A of the present embodiment, two images can be acquired by taking two shots with different exposure control value settings. The resulting two images can then be composited together. As a result, the imaging apparatus 1A is able to generate an image with a high dynamic range relative to the imaging element 5.

Figure 6A:
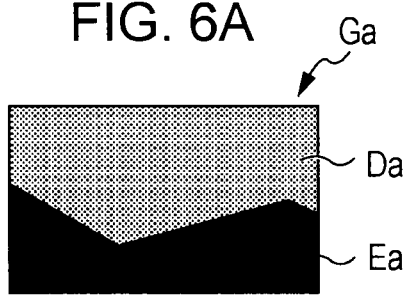
FIG. 6A is a diagram for explaining high dynamic range achieved by image compositing.
Figure 6B:
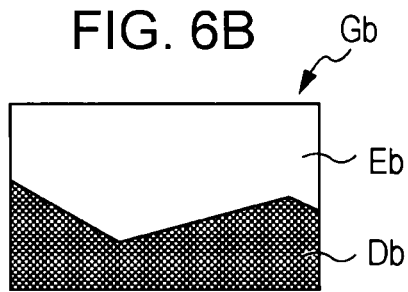
FIG. 6B is a diagram for explaining high dynamic range achieved by image compositing.
Figure 6C:
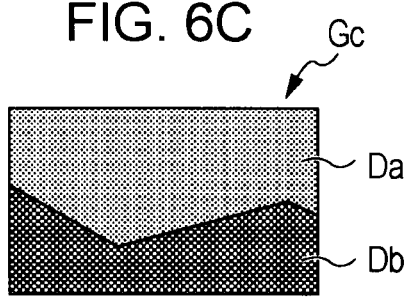
FIG. 6C is a diagram for explaining high dynamic range achieved by image compositing.

When there is high contrast in a scene to be shot, the dynamic range of the imaging element 5 might not fully cover the contrast range exhibited in the scene. For this reason, a single shot of the same subject might result in a blocked up (i.e., underexposed) portion Ea like that in the image Ga shown in FIG. 6A, or a blown out (i.e., overexposed) portion Eb like that in the image Gb shown in FIG. 6B. Consequently, in the imaging apparatus 1A of the present embodiment, multiple images (such as the two images Ga and Gb, for example) are acquired by shooting the same subject while modifying the shutter speed (i.e., varying the exposure). By compositing the non-underexposed image portion Da in the image Ga with the non-overexposed image portion Db in the image Gb, a subject image with pseudo-expanded dynamic range can be created, like the composite image Gc shown in FIG. 6C.

More specifically, the same scene is shot twice. In the first shot, the bright portion of the subject is emphasized, and the subject is shot with an exposure control value that uses the bright portion as a reference (hereinafter also referred to as the bright reference). In the second shot, the dark portion of the subject is emphasized, and the subject is shot with an exposure control value that uses the dark portion as a reference (hereinafter also referred to as the dark reference). In so doing, the image Ga (see FIG. 6A) shot at the bright reference exposure contains an image portion Da wherein highlight tones are suitably reproduced, as well as an underexposed portion Ea. Meanwhile, the image Gb (see FIG. 6B) shot at the dark reference exposure contains an image portion Db wherein shadow tones are suitably reproduced, as well as an overexposed portion Eb. By interpolating the underexposed portion Ea that occurred in the image Ga due to the bright reference exposure with the image portion Db extracted from the other image Gb, and by likewise interpolating the overexposed portion Eb that occurred in the image Gb due to the dark reference exposure with the image portion Da extracted from the other image Ga, a composite image Gc (see FIG. 6C) can be generated that contains the image portions Da and Db wherein highlight and shadow tones are respectively reproduced, thereby making it possible to expand the dynamic range.

In the imaging apparatus 1A as described above, it is thus possible to expand the dynamic range by compositing two images that were successively acquired by the imaging element 5 using different exposure control value settings. Hereinafter, a technique for setting different exposure control values will be described with reference to FIG. 7.

Figure 7:
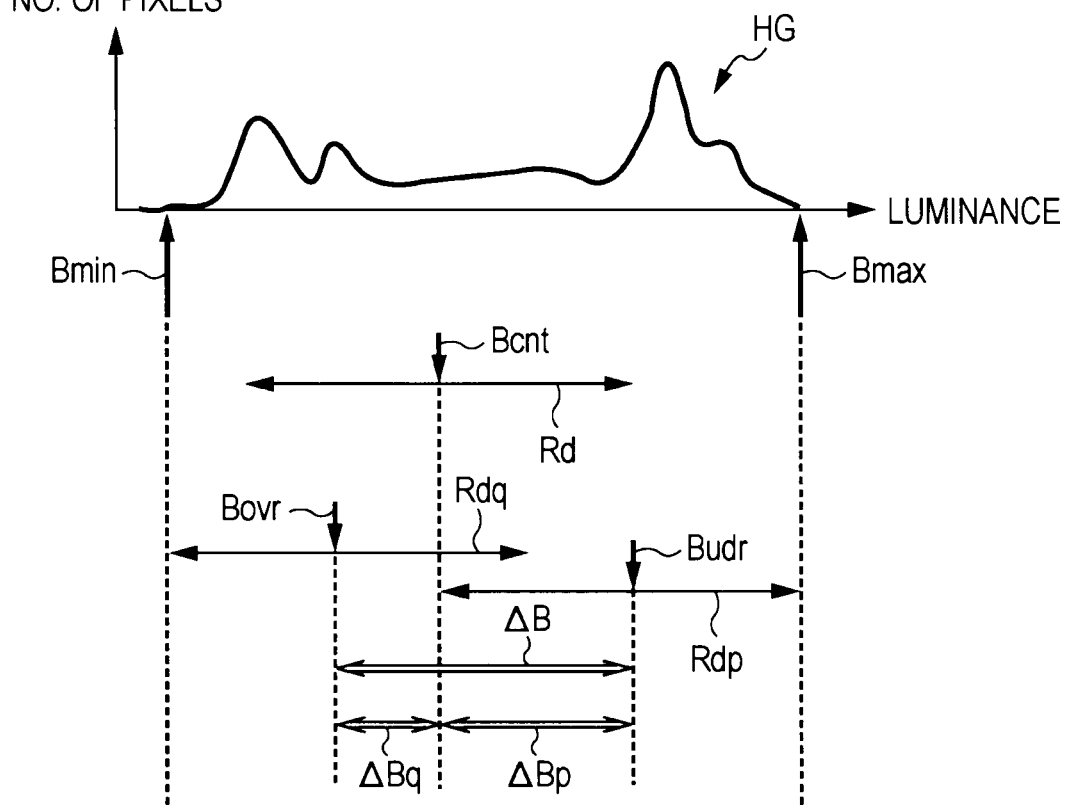
FIG. 7 is a diagram for explaining a technique for setting different exposure control values.

FIG. 7 is a diagram for explaining a technique for setting different exposure control values. The upper part of FIG. 7 illustrates a luminance histogram HG (hereinafter also simply referred to as the histogram HG). The histogram HG shows the luminance distribution of an image acquired by the imaging element 5 in Live View mode, for example.

First, in the histogram HG illustrating the luminance information of the subject, the maximum (i.e., highest) luminance value Bmax and the minimum (i.e., lowest) luminance value Bmin are detected. In other words, the maximum luminance value Bmax and the minimum luminance value Bmin are detected from a histogram HG that is based on an image obtained by the imaging element 5. Herein, the maximum luminance value Bmax is found by counting a certain number of pixels α (where α is several pixels, for example) in the direction of decreasing luminance, starting from the pixel with the largest luminance value in the histogram HG. The luminance value of the resulting pixel after the count is taken to be the maximum luminance value Bmax. Similarly, the minimum luminance value Bmin is found by counting a certain number of pixels α (where α is several pixels, for example) in the direction of increasing luminance, starting from the pixel with the smallest luminance value in the histogram HG. The luminance value of the resulting pixel after the count is taken to be the minimum luminance value Bmin. If the maximum and minimum luminance values Bmax and Bmin are set in this way, then single-pixel spikes of overexposure or underexposure can be eliminated as error, for example, and suitable maximum and minimum luminance values Bmax and Bmin can be obtained. It should be appreciated that the maximum and minimum luminance values Bmax and Bmin can also be detected without creating a histogram HG on the basis of a subject image obtained by the imaging element 5 in Live View mode. Instead, the maximum and minimum luminance values can be detected from the luminance values obtained by the respective light meter zones Ea (see FIG. 4) in the light meter element 44 that receives subject light.

Next, a suitable exposure control value Bcnt will be computed on the basis of suitable subject luminance values obtained from a histogram HG, in the case of normal shooting (i.e., taking only a single shot with respect to a scene) in a user-set Light Meter mode.

Herein, when shooting with the above exposure control value Bcnt set, only a luminance range Rd corresponding to the dynamic range of the imaging element 5 will be covered. For this reason, with a single shot, an underexposed portion Ea (see FIG. 6A) or an overexposed portion Eb (see FIG. 6B) might occur. Consequently, in order to favorably reproduce a subject having the luminance characteristics of the histogram HG, the imaging apparatus 1A is configured to composite two images obtained by taking two shots as described earlier. The respective exposure control values set for these two shots are herein referred to as the bright reference exposure control value Budr and the dark reference exposure control value Bovr, and are computed using the following Eqs. 1 to 4.

$$\Delta Bp = (B\mathrm{max} - B cnt) \times k \quad (1)$$

$$\Delta Bq = (B\mathrm{min} - B cnt) \times k \quad (2)$$

$$Budr = Bcnt + \Delta Bp \quad (3)$$

$$Bovr = Bcnt + \Delta Bq \quad (4)$$

The constant k in Eqs. 1 and 2 is a predetermined coefficient with a value within the range from 0 to 1, herein set to 0.5, for example.

By computing using the above Eqs. 1 to 4, the bright reference exposure control value Budr and the dark reference exposure control value Bovr are calculated. Between these exposure control values, an exposure step ΔB is produced, as given by the following Eq. 5.

$$\Delta B = \Delta Bp - \Delta Bq \quad (5)$$

By substituting the above Eqs. 1 and 2 into Eq. 5, the following Eq. 6 for the exposure step ΔB is obtained.

$$\Delta B = (B\mathrm{max} - B\mathrm{min}) \times k \quad (6)$$

A range of exposure control values is thus set having an exposure step ΔB corresponding to the value obtained by multiplying the luminance range (Bmax-Bmin) detected from the histogram HG by a coefficient k. Imaging is then conducted twice with respectively different exposure control values Budr and Bovr that fall within the above range of exposure control values. In so doing, it becomes possible to reproduce the tones of the subject in the respective high-luminance and low-luminance ranges Rdp and Rdq (see FIG. 7) that correspond to the dynamic range of the imaging element 5. Herein, when imaging in the present embodiment is executed once rather than twice (i.e., normal shooting), the suitable exposure control value Bcnt set for the one shot (i.e., the single exposure control value) is contained within the range of exposure control values having the exposure step ΔB. As a result, a subject having a luminance range (Bmax-Bmin) exceeding the dynamic range of the imaging element 5 can be suitably reproduced without overexposure or underexposure by means of image compositing.

Hereinafter, the technique of computing the bright reference exposure control value Budr and the dark reference exposure control value Bovr will be described using a specific example. The following example describes the case wherein Bcnt is set to 6.0 [EV] as the suitable exposure control value for a subject having a maximum luminance value Bmax of 8.0 [BV] and a minimum luminance value Bmin of 3.0 [BV].

From the above Eqs. 1 and 2, first ΔBp=(8.0−6.0)×0.5=+1.0 [EV] and ΔBq=(3.0−6.0)×0.5=−1.5 [EV] are computed. Subsequently, substituting the calculated ΔBp and ΔBq into Eqs. 3 and 4 yields Budr=6.0+1.0=7.0 [EV] and Bovr=6.0−1.5=4.5 [EV]. Two shots are thus taken, set at the bright reference exposure control value Budr and the dark reference exposure control value Bovr, respectively above and below the suitable exposure control value Bcnt. By subsequently compositing the two resulting images, it becomes possible to generate a subject image with favorable tone reproduction, even with respect to a high-contrast scene.

The specific operation of an imaging apparatus 1A configured as above will now be described.

[Operation of Imaging Apparatus 1A]

Figure 8:
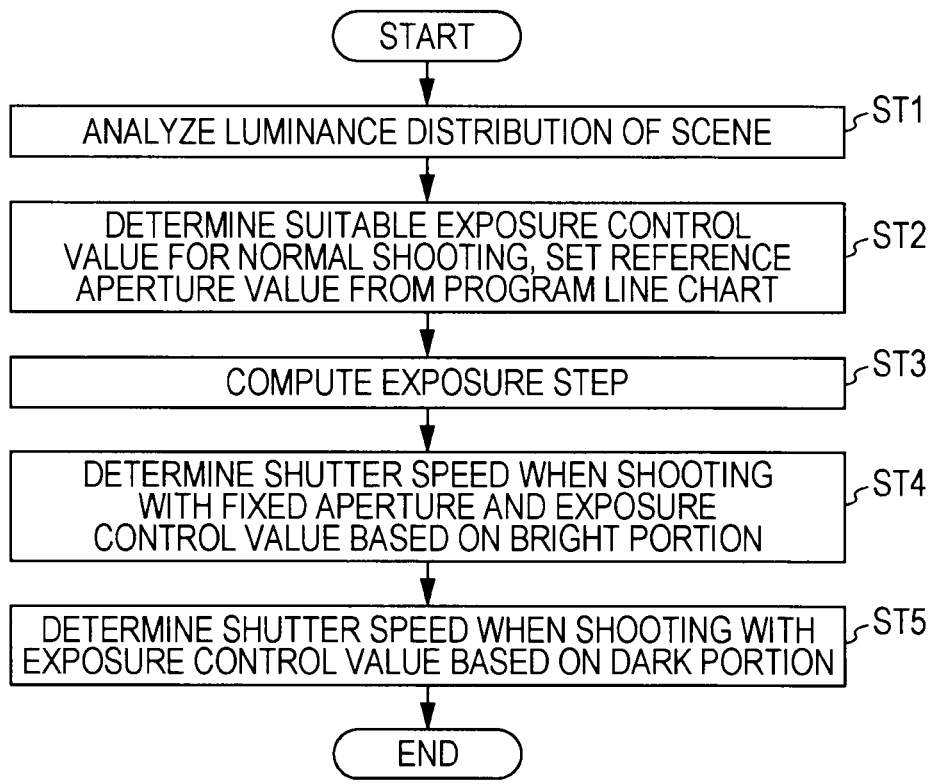
FIG. 8 is a flowchart illustrating the basic operation of an imaging apparatus in accordance with the first embodiment.

FIG. 8 is a flowchart illustrating the basic operation of the imaging apparatus 1A. FIG. 8 shows the exposure control operation for the case wherein the Multi-Segment Metering mode is set, and wherein the above-described Program Exposure mode or Scene Selector mode is set as the exposure mode. The exposure control operation shown in FIG. 8 is executed by the master controller 101A.

In step ST1, the luminance distribution of the scene corresponding to the subject is analyzed. At this point, the maximum luminance value Bmax and the minimum luminance value Bmin may be calculated on the basis of the subject luminance information detected by the light meter element 44, for example. It should be appreciated that the maximum luminance value Bmax and the minimum luminance value Bmin may also be calculated without using the light meter element 44 by creating a histogram HG shown by way of example in FIG. 7 on the basis of an image acquired by the imaging element 5 in Live View mode.

In step ST2, a suitable exposure control value for normal shooting (i.e., the case of taking a single shot) is determined, and a reference aperture value is set from the program line chart. More specifically, the suitable exposure control value Bcnt described earlier is calculated by means of predetermined exposure computations, and then the aperture value AVr is set as the reference aperture value. The aperture value AVr is obtained from the point Pk in the program line chart shown in FIG. 5, where the falling line Le (i.e., the broken line) expressing the exposure control value Bcnt intersects the program line Lp (i.e., the bolded solid line). In other words, the aperture value AVr is determined in accordance with the suitable exposure control value (i.e., the single exposure control value) Bcnt from the program line chart, which defines the relationship between shutter speeds (i.e., exposure times) for the imaging element 5 and aperture values for the shutter 4. This aperture value AVr is set as the reference aperture value, which is kept constant for both shots.

In step ST3, the exposure step ΔB corresponding to the difference between the respective exposure control values set for the two shots is computed. More specifically, the exposure step ΔB is calculated using the above Eq. 6, on the basis of the maximum luminance value Bmax and the minimum luminance value Bmin obtained in step ST1.

In step ST4, the aperture is fixed and the shutter speed TVp is determined for the case of shooting with the bright reference exposure control value. More specifically, the above Eqs. 1 and 3 are used to calculate the bright reference exposure control value Budr on the basis of the suitable exposure control value Bcnt obtained in step ST2. In addition, using the program line chart shown in FIG. 5, the shutter speed TVp is set in accordance with the bright reference exposure control value Budr, without changing the above aperture value AVr. Herein, the difference Tk between the shutter speed TVp and the shutter speed at the intersection point Pk (see FIG. 5) corresponds to the ΔBp calculated in Eq. 1.

In step ST5, the shutter speed TVq is determined for the case of shooting with the dark reference exposure control value. More specifically, the above Eqs. 2 and 4 are used to calculate the dark reference exposure control value Bovr on the basis of the suitable exposure control value Bcnt obtained in step ST2. In addition, using the program line chart shown in FIG. 5, the shutter speed TVq is set in accordance with the dark reference exposure control value Bovr, without changing the above aperture value AVr. Herein, the difference Tj between the shutter speed TVq and the shutter speed at the intersection point Pk (see FIG. 5) corresponds to the ΔBq calculated in Eq. 2.

Thus, in the above steps ST4 and ST5, the respective shutter speeds (i.e., exposure times) TVp and TVq for the two shots are set on the basis of the bright and dark reference exposure control values Budr and Bovr, as well as the reference aperture value AVr. In so doing, two images shot at different exposures are acquired. If the two images are subsequently composited by the image compositor 59 to generate the composite image Gc shown in FIG. 6C, it becomes possible to obtain a subject image with expanded dynamic range as compared to that of the imaging element 5.

In the imaging apparatus 1A described above, the maximum and minimum luminance values Bmax and Bmin of the subject are detected, and then substituted into the above Eqs. 1 to 5 to compute the bright and dark reference exposure control values Budr and Bovr having the exposure step ΔB. Subsequently, two images are obtained by taking two shots with the exposure control values Budr and Bovr respectively set for each shot. The two images are then composited as shown in FIG. 6 to generate a composite image with expanded dynamic range. In so doing, multiple shots can be taken that suitably reflect the luminance range of a subject, even with respect to a high-contrast scene. For this reason, it becomes possible to effectively utilize the dynamic range of the imaging element 5, and generate favorable composite images wherein overexposure and underexposure are suppressed.

In other words, when taking two shots, if the exposure step ΔB set in accordance with the luminance range of the scene is not suitably set, then there is a high probability that tone breaks will occur in the final composite image. Particularly, if an overly large exposure step ΔB is defined when the luminance range of the scene is small, a subject image is generated whose range has been expanded that of the original scene. This constricts the range of tones that should be reproduced, and ultimately results in a composite image exhibiting decreased contrast. However, since the respective exposure control values set in the imaging apparatus 1A of the present embodiment are dependent on the luminance range of the scene, a composite image with favorable contrast can be generated.

<Second Embodiment>

An imaging apparatus 1B in accordance with a second embodiment of the present invention has a similar configuration to that of the imaging apparatus 1A of the first embodiment, but differs in the configuration of the master controller.

In other words, the master controller 101B of the second embodiment stores in ROM a program that executes the operation described hereinafter.

[Operation of Imaging Apparatus 1B]

Figure 9:
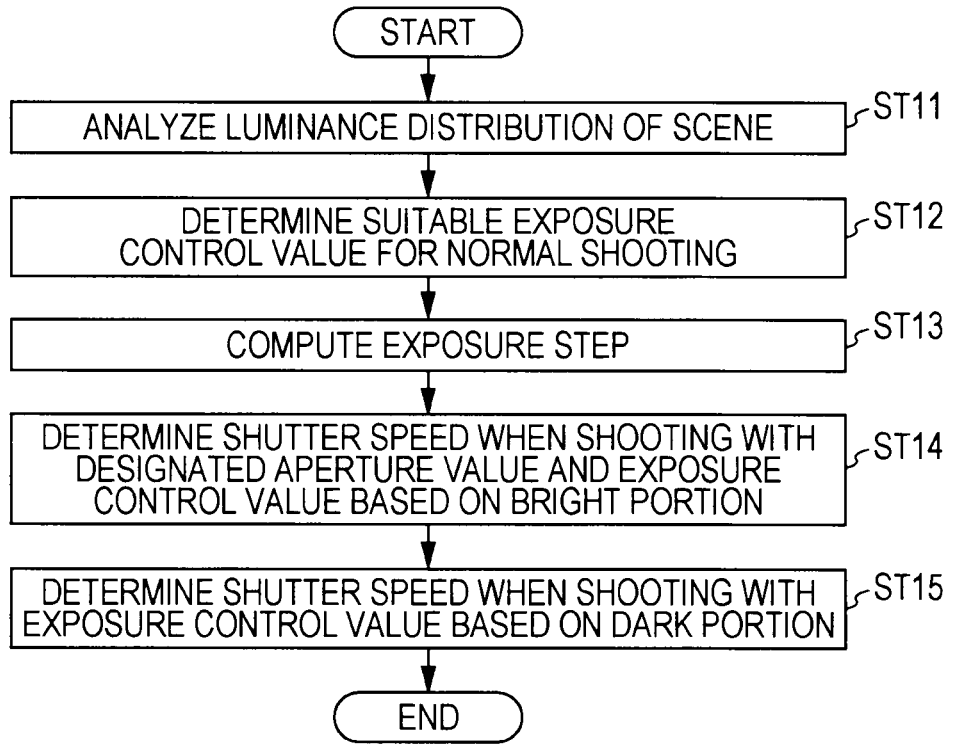
FIG. 9 is a flowchart illustrating the basic operation of an imaging apparatus in accordance with a second embodiment of the present invention.

FIG. 9 is a flowchart illustrating the basic operation of the imaging apparatus 1B. FIG. 9 shows the exposure control operation for the case wherein the Multi-Segment Metering mode is set, and wherein the above-described Aperture Priority mode is set as the exposure mode. The exposure control operation shown in FIG. 9 is executed by the master controller 101B.

In step ST11, operation is conducted similar to that of step ST1 in the flowchart shown in FIG. 8.

In step ST12, a suitable exposure control value is determined for normal shooting (i.e., the case of taking a single shot) wherein the user has used the control value dial 86 to specify a particular aperture value setting. More specifically, the suitable exposure control value Bcnt for normal shooting is calculated by means of predetermined exposure computations.

In step ST13, operation is conducted similar to that of step ST3 in the flowchart shown in FIG. 8.

In step ST14, the shutter speed TVa is determined for the case of shooting with the bright reference exposure control value Budr and the user-specified aperture value. More specifically, the above Eqs. 1 and 3 are used to calculate the bright reference exposure control value Budr on the basis of the suitable exposure control value Bcnt obtained in step ST12. The shutter speed TVa is then derived by subtracting the user-specified aperture value from the exposure control value Budr.

In step ST15, the shutter speed TVb is determined for the case of shooting with the dark reference exposure control value and the user-specified aperture value. More specifically, the above Eqs. 2 and 4 are used to calculate the dark reference exposure control value Bovr on the basis of the suitable exposure control value Bcnt obtained in step ST12. The shutter speed TVb is then derived by subtracting the user-specified aperture value from the exposure control value Bovr.

Thus, in the above steps ST14 and ST15, the user-specified aperture value is set as a reference aperture value that is kept constant for both shots, and the respective shutter speeds TVa and TVb for the two shots are set on the basis of this reference aperture value, as well as the bright and dark reference exposure control values Budr and Bovr. In so doing, two images shot at different exposures are acquired. If the two images are subsequently composited to generate the composite image Gc shown in FIG. 6C, it becomes possible to obtain a subject image with expanded dynamic range as compared to that of the imaging element 5.

In the imaging apparatus 1B described above, and similarly to the first embodiment described earlier, multiple shots can be taken that suitably reflect the luminance range of a subject, even with respect to a high-contrast scene. For this reason, it becomes possible to effectively utilize the dynamic range of the imaging element 5, and generate favorable composite images wherein overexposure and underexposure are suppressed.

<Third Embodiment>

An imaging apparatus 10 in accordance with a third embodiment of the present invention has a similar configuration to that of the imaging apparatus 1A of the first embodiment, but differs in the configuration of the master controller.

In other words, the master controller 101C of the third embodiment stores in ROM a program that executes the operation described hereinafter.

[Operation of Imaging Apparatus 1C]

FIG. 10 is a flowchart illustrating the basic operation of the imaging apparatus 10. FIG. 10 shows the exposure control operation for the case wherein the Multi-Segment Metering mode is set, and wherein the above-described Shutter Speed Priority mode is set as the exposure mode. The exposure control operation shown in FIG. 10 is executed by the master controller 101C.

In step ST21, operation is conducted similar to that of step ST1 in the flowchart shown in FIG. 8.

In step ST22, a suitable exposure control value is determined for normal shooting (i.e., the case of taking a single shot) wherein the user has used the control value dial 86 to specify a particular shutter speed TVs. More specifically, the suitable exposure control value Bcnt for normal shooting is calculated by means of predetermined exposure computations.

In step ST23, operation is conducted similar to that of step ST3 in the flowchart shown in FIG. 8.

In step ST24, the aperture value is determined for the case of shooting with the bright reference exposure control value Budr and the user-specified shutter speed TVs. More specifically, the above Eqs. 1 and 3 are used to calculate the bright reference exposure control value Budr on the basis of the suitable exposure control value Bcnt obtained in step ST22. The aperture value AVs is then derived by subtracting the user-specified shutter speed TVs from the exposure control value Budr.

In step ST25, the shutter speed TVt is determined for the case of shooting with the dark reference exposure control value Bovr and the aperture value AVs that was determined in step ST24. More specifically, the above Eqs. 2 and 4 are used to calculate the dark reference exposure control value Bovr on the basis of the suitable exposure control value Bcnt obtained in step ST22. The shutter speed TVt is then derived on the basis of the exposure control value Bovr without modifying the aperture value AVs that was set in step S24.

Thus, in the above steps ST24 and ST25, the aperture value AVs is calculated in accordance with the user-specified shutter speed (i.e., exposure time) TVs at the bright reference exposure control value Budr used to obtain the brightest image from among those obtained using the respective exposure control values Budr and Bovr. This aperture value AVs is then set as a reference aperture value that is kept constant for both shots. The respective shutter speeds TVs (the user-specified shutter speed) and TVt for the two shots are then set on the basis of this reference aperture value, as well as the bright and dark reference exposure control values Budr and Bovr. In so doing, two images shot at different exposures are acquired. If the two images are subsequently composited to generate the composite image Gc shown in FIG. 6C, it becomes possible to obtain a subject image with expanded dynamic range as compared to that of the imaging element 5.

In the imaging apparatus 1C described above, and similarly to the embodiments described earlier, multiple shots can be taken that suitably reflect the luminance range of a subject, even with respect to a high-contrast scene. For this reason, it becomes possible to effectively utilize the dynamic range of the imaging element 5, and generate favorable composite images wherein overexposure and underexposure are suppressed.

<Fourth Embodiment>

An imaging apparatus 10 in accordance with a fourth embodiment of the present invention has a similar configuration to that of the imaging apparatus 1A of the first embodiment, but differs in the configuration of the master controller.

In other words, the master controller 101D of the fourth embodiment stores in ROM a program that executes the operation described hereinafter.

[Operation of Imaging Apparatus 1D]

FIG. 11 is a flowchart illustrating the basic operation of the imaging apparatus 10. FIG. 11 shows the exposure control operation for the case wherein the Multi-Segment Metering mode is set, and wherein the above-described Manual Exposure mode is set as the exposure mode. The exposure control operation shown in FIG. 11 is executed by the master controller 101D.

In steps ST31 and ST32, operation is conducted similar to that of steps ST1 and ST2 in the flowchart shown in FIG. 8.

In step ST33, the bright reference exposure control value Budr is determined given a user-specified aperture value and shutter speed set using the control value dial 86. In other words, for the shot taken at the bright reference exposure control value Budr, the user-specified aperture value and shutter speed are used.

In step ST34, the shutter speed TVn is determined for the case of shooting with the dark reference exposure control value and the user-specified aperture value. More specifically, the dark reference exposure control value Bovr is calculated by subtracting the exposure step ΔB that was computed in step ST32 from the bright reference exposure control value Budr set in step ST33. The shutter speed TVn is then set in accordance with the dark reference exposure control value Bovr without modifying the user-specified aperture value. This shutter speed TVn is longer than the user-specified shutter speed TVm by an amount equal to the exposure step ΔB.

Thus, in the above steps ST33 and ST34, an exposure control value obtained from a user-specified aperture value and shutter speed (i.e., exposure time) is set as the bright reference exposure control value Budr used to obtain the brighter of the two shots. Meanwhile, the user-specified aperture value is set as a reference aperture value that is kept constant for both shots, and the respective shutter speeds TVm and TVn for the two shots are set on the basis of this reference aperture value, as well as the bright and dark reference exposure control values Budr and Bovr. In so doing, two images shot at different exposures are acquired. If the two images are subsequently composited to generate the composite image Gc shown in FIG. 6C, it becomes possible to obtain a subject image with expanded dynamic range as compared to that of the imaging element 5.

In the imaging apparatus 1D described above, and similarly to the embodiments described earlier, multiple shots can be taken that suitably reflect the luminance range of a subject, even with respect to a high-contrast scene. For this reason, it becomes possible to effectively utilize the dynamic range of the imaging element 5, and generate favorable composite images wherein overexposure and underexposure are suppressed.

<Fifth Embodiment>

An imaging apparatus 1E in accordance with a fifth embodiment of the present invention has a similar configuration to that of the imaging apparatus 1A of the first embodiment, but differs in the configuration of the master controller.

In other words, the master controller 101E of the fifth embodiment stores in ROM a program that executes the operation described hereinafter.

[Operation of Imaging Apparatus 1E]

FIG. 12 is a flowchart illustrating the basic operation of the imaging apparatus 1E. FIG. 12 shows the exposure control operation for the case wherein the Spot Metering mode is set, and wherein the above-described Aperture Priority mode is set as the exposure mode. The exposure control operation shown in FIG. 12 is executed by the master controller 101E.

In steps ST41 and ST42, operation is conducted similar to that of steps ST1 and ST3 in the flowchart shown in FIG. 8.

In step ST43, the bright reference exposure control value Budr is determined to be the suitable exposure value when spot metering by means of the light meter element 44 with a user-specified aperture value set using the control value dial 86. In other words, the bright reference exposure control value Budr is set equal to the suitable exposure value calculated by means of predetermined exposure computations on the basis of luminance information acquired by spot metering. For this reason, the bright reference exposure shift ΔBp shown in FIG. 7 becomes 0. The shutter speed TVc for the shot at the bright reference exposure is then derived by subtracting the user-specified aperture value from the bright reference exposure control value Budr set as described above.

In step ST44, the shutter speed TVd is determined for the case of shooting with the dark reference exposure control value and the user-specified aperture value. More specifically, the above Eqs. 2 and 4 are used to calculate the dark reference exposure control value Bovr on the basis of the suitable exposure control value Bcnt that was set as the bright reference exposure control value Budr in step ST43. The shutter speed TVd is then derived by subtracting the user-specified aperture value from the exposure control value Bovr.

Thus, two shots are taken using the respective shutter speeds TVc and TVd set in the above steps ST43 and ST44. In so doing, two images are shot with the exposure modified by an exposure step ΔB in accordance with a scene wherein the subject portion is used as the spot meter reference (i.e., in accordance with the luminance range of the subject). If the two images are subsequently composited to generate the composite image Gc shown in FIG. 6C, it becomes possible to obtain a subject image with expanded dynamic range as compared to that of the imaging element 5.

In the imaging apparatus 1E described above, and similarly to the embodiments described earlier, multiple shots can be taken that suitably reflect the luminance range of a subject, even with respect to a high-contrast scene. For this reason, it becomes possible to effectively utilize the dynamic range of the imaging element 5, and generate favorable composite images wherein overexposure and underexposure are suppressed.

<Sixth Embodiment>

An imaging apparatus 1F in accordance with a sixth embodiment of the present invention has a similar configuration to that of the imaging apparatus 1A of the first embodiment, but differs in the configuration of the master controller.

In other words, the master controller 101F of the sixth embodiment stores in ROM a program that executes the operation described hereinafter.

[Operation of Imaging Apparatus 1F]

FIG. 13 is a diagram for explaining the operation of the imaging apparatus 1F. More particularly, FIG. 13 explains the respective exposure values set when taking five shots. FIG. 13 herein corresponds to FIG. 7.

In the imaging apparatus 1F, and similarly to the imaging apparatus 1A described earlier, the maximum luminance value Bmax and the minimum luminance value Bmin are detected from the histogram HG, and a suitable exposure control value Bcnt is computed for normal shooting (i.e., the case of taking a single shot). Subsequently, the above Eqs. 1 to 4 are used to calculate the bright reference exposure control value Budr and the dark reference exposure control value Bovr.

In the imaging apparatus 1F of the present embodiment, five shots at respectively different exposures are taken, each exposure falling within the exposure step ΔB between the bright reference exposure control value Bovr and the dark reference exposure control value Budr. A method of setting the exposure control values Ba to Be for each shot will now be described.

First, the maximum and minimum exposure control values Ba and Bb in FIG. 13 are set equal to the bright and dark reference exposure control values Budr and Bovr, while the exposure control value Bc is set equal to the suitable exposure control value Bcnt. The remaining two exposure control values Bd and Be are set as follows: Bd is set equal to the bisecting intermediate value between the exposure control values Ba and Bc, while Be is set equal to the bisecting intermediate value between the exposure control values Bb and Bc.

By setting such exposure control values Ba to Be, shots can be taken at the suitable exposure control value Bc, as well as at the nearby exposure control values Bd and Be. For this reason, images can be acquired under favorable exposure conditions for the primary subject, such as a person's face. Additionally, when the five images obtained by taking the five shots are composited to generate a high dynamic range composite image, the primary subject (such as a face) is cut out from the image shot at a suitable exposure with the exposure control value Bc, and composited into the other images that were shot. Since the five shots taken in this way include a shot taken at a suitable exposure value calculated by means of predetermined exposure computations on the basis of the subject's luminance information, the primary subject can be reproduced under suitable exposure conditions in the composite images.

It should be appreciated that the respective exposure control values for the five shots described above may also be set to values falling within the exposure step ΔB between the bright reference exposure control value Bovr and the dark reference exposure control value Budr that are other than the exposure control values Ba to Be described above. For example, the respective exposure control values B1 to B5 (see FIG. 13) for each shot may also be set in accordance with the following Eqs. 7 to 9.

$$B_{n=1} = (Bmax - Bcnt) \times k + Bcnt \tag{7}$$

$$B_{n=2} = (Bmin - Bcnt) \times k + Bcnt \tag{8}$$

$$B_{n>2} = (B1 - B2)/(Ns - 1) \times (n - 2) + B2 \tag{9}$$

Herein, Ns expresses the number of shots to be taken (i.e., 5 in the present embodiment).

If the above Eqs. 7 to 9 are used to calculate the respective exposure control values B1 to B5, then exposure control values B1 to B5 are set at equal intervals within the exposure step ΔB between the bright reference exposure control value Bovr and the dark reference exposure control value Budr.

In the imaging apparatus 1F described above, and similarly to the embodiments described earlier, multiple shots can be taken that suitably reflect the luminance range of a subject, even with respect to a high-contrast scene. For this reason, it becomes possible to effectively utilize the dynamic range of the imaging element 5, and generate favorable composite images wherein overexposure and underexposure are suppressed.

It should be appreciated that the imaging apparatus 1F is not limited to taking five shots, and that three, four, or six or more shots respectively set at different exposure control values may also be taken. In such cases, when taking three shots, the three exposure control values Ba, Bb, and Bc, or alternatively, the three exposure control values B1, B2, and B4 shown by way of example in FIG. 13 may be set. When taking four shots, the four exposure control values Ba to Bd shown by way of example in FIG. 13 may be set. By compositing images obtained by taking multiple shots at exposure control values set in this way, a composite image with expanded dynamic range can be obtained.

As described above, in the foregoing embodiments, a composite image can be generated with its dynamic range suitably expanded by using the exposure step ΔB. However, calculating an adequate exposure step ΔB by means of Eq. 6 involves precisely detecting the luminance range (Bmax-Bmin) of the subject. Because of the properties of typical light metering using a light meter element, there is a tendency for the reliability to decrease for low-light subjects. Techniques for favorably detecting the subject's luminance range by means of a light meter element even in such low-light scenes will now be described in the following embodiments.

<Seventh Embodiment>

An imaging apparatus 1G in accordance with a seventh embodiment of the present invention has a similar configuration to that of the imaging apparatus 1A of the first embodiment, but differs in the configuration of the light meter element and the master controller.

Figure 14:
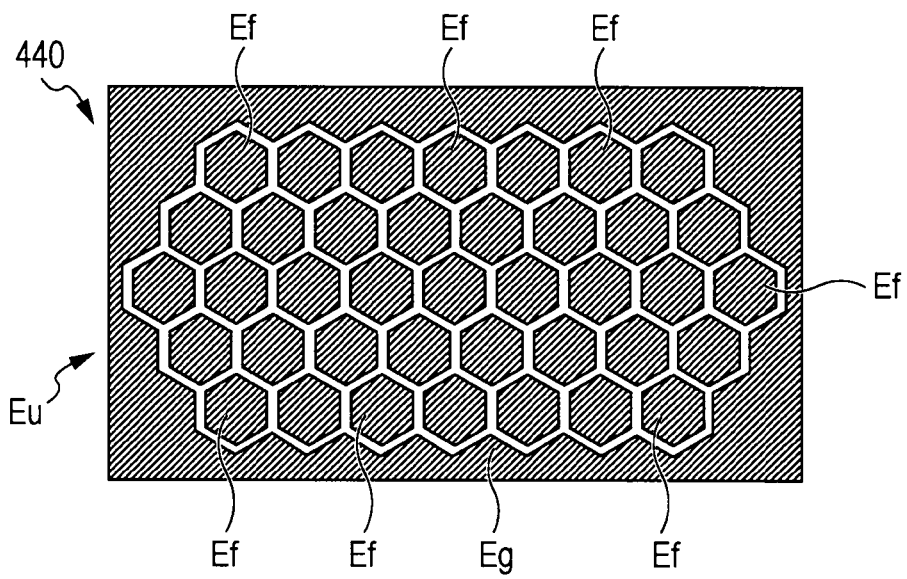
FIG. 14 is a diagram for explaining the configuration of a light meter element in an imaging apparatus in accordance with a seventh embodiment of the present invention.

In other words, the light meter element 440 in the seventh embodiment is configured similarly to that of the first embodiment, as a sensor detecting the luminance of the subject and provided in the optical viewfinder, for example. As shown in FIG. 14, the light meter area Eu is split into 40 zones, with each zone being able to independently measure the luminance. More specifically, the light meter element 440 is provided with a plurality of silicon photo cells (SPCs), 39 of which are small photo cells Ef (hereinafter also referred to as small cells) arranged in a honeycomb structure, and one of which is a large photo cell Eg (hereinafter also referred to as the large cell) provided in a ring around the small cells. In other words, the light meter element 440 is provided with 39 small cells (i.e., photo cells) Ef and one large cell (i.e., photo cell) Eg into which the light meter area Eu is split, and is able to output light meter values from each of the photo cells Ef and Eg as the luminance information of the subject. The characteristics of the light meter element 440 will be later described in detail.

Figure 15:
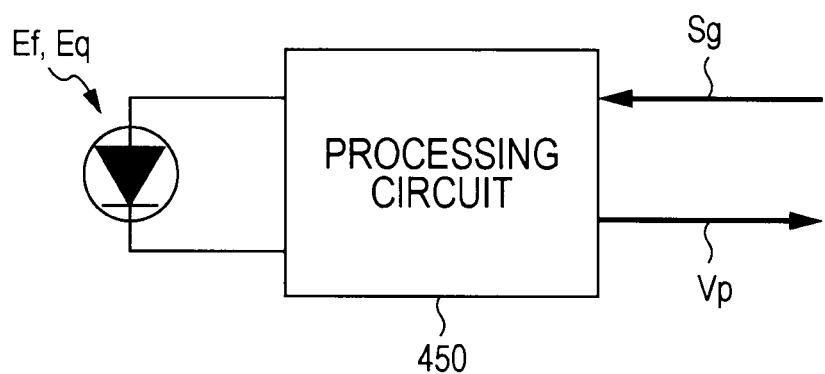
FIG. 15 illustrates a processing circuit that processes charge output from individual light meter cells.

Additionally, a processing circuit 450 is also provided in the light meter 45 (see FIG. 15). The processing circuit 450 is electrically connected to each of the photo cells Ef and Eg, and processes the charge output from each of the photo cells Ef and Eg. In this processing circuit 450, light meter operations (i.e., photoelectric conversion operations) by each of the photo cells Ef and Eg are controlled on the basis of a control signal Sg from the master controller 101G, for example. An output voltage Vp is then generated as the measured value of the light meter by performing processing such as logarithmic compression, temperature compensation, and gain application with respect to the charge that has been photoelectrically converted and accumulated (i.e., the accumulated charge) in each of the photo cells Ef and Eg.

In addition, the master controller 101G of the seventh embodiment stores in ROM a program that executes the operation of the imaging apparatus 1G described hereinafter.

[Detection of Subject's Luminance Range Using Light Meter Element 440]

In the light meter element 440, basically charge proportional to a quantity of incident light is accumulated by means of photoelectric conversion. However, in the small cells Ef receiving light from a low-light subject, this proportional relationship (i.e., a linear curve) is not established. This is because in the small cells Ef wherein the photosensitive area is small, the amount of charge produced by photoelectric conversion for a low-light scene is also small, and becomes non-linear. In the small cells Ef, there is a luminance limit (such as 2 EV) beyond which the linear precision is no longer compensated. Hereinafter, this limit is also referred to as the light meter luminance limit. Meanwhile, since the photosensitive area of the large cell Eg is large with respect to that of the small cells Ef, linear precision can be achieved even in low-light scenes. Utilizing the characteristics of the large cell Eg, the light meter element 440 is thus able to improve light meter precision in low-light scenes by using the light meter value of the large cell Eg instead of the light meter values of the small cells Ef when the output voltage Vp (see FIG. 15) is small and unreliable.

However, as the number of small cells Ef detecting a luminance value (i.e., a light meter value) less than the light meter luminance limit increases, the light meter values of these small cells Ef are replaced by the light meter value of the single large cell Eg, thus leading to decreased light meter precision in the light meter element 440.

Consequently, in the imaging apparatus 1G of the present embodiment, the final luminance range of the subject used to compute the exposure step ΔB (hereinafter also referred to as the final luminance range) is derived from the luminance range obtained by measurement with the light meter 45 on the basis of the light meter values (i.e., the maximum and minimum luminance values Bmax and Bmin) from the respective light meter cells Ef and Eg in the light meter element 440 (hereinafter also referred to as the measured luminance range), with additional consideration for a luminance range prescribed in advance (hereinafter also referred to as the prescribed luminance range). The prescribed luminance range herein may, for example, be set to 2.0 EV for night scenes, and to 1.0 EV for night scenes containing people.

A specific technique for computing the final luminance range of the subject will now be described. The subject's final luminance range Bcon is calculated using the following Eq. 10.

$$Bcon = \alpha \times Bmes + \beta \times Bset \qquad (10)$$

Herein, Bmes expresses the measured luminance range, and Bset expresses the prescribed luminance range. In addition, α and β express the coefficients for blending the measured luminance range Bmes and the prescribed luminance range Bset (i.e., the blend ratios). The coefficients α and β are varied in accordance with the graph shown in FIG. 16, such that the relationship α+β=1 is maintained. In the graph shown in FIG. 16, the horizontal axis indicates the number of photo cells Ef (i.e., small cells) having a light meter value at or above the light meter luminance limit, while the vertical axis indicates the blend ratios α and β in the above Eq. 10.

Figure 16:
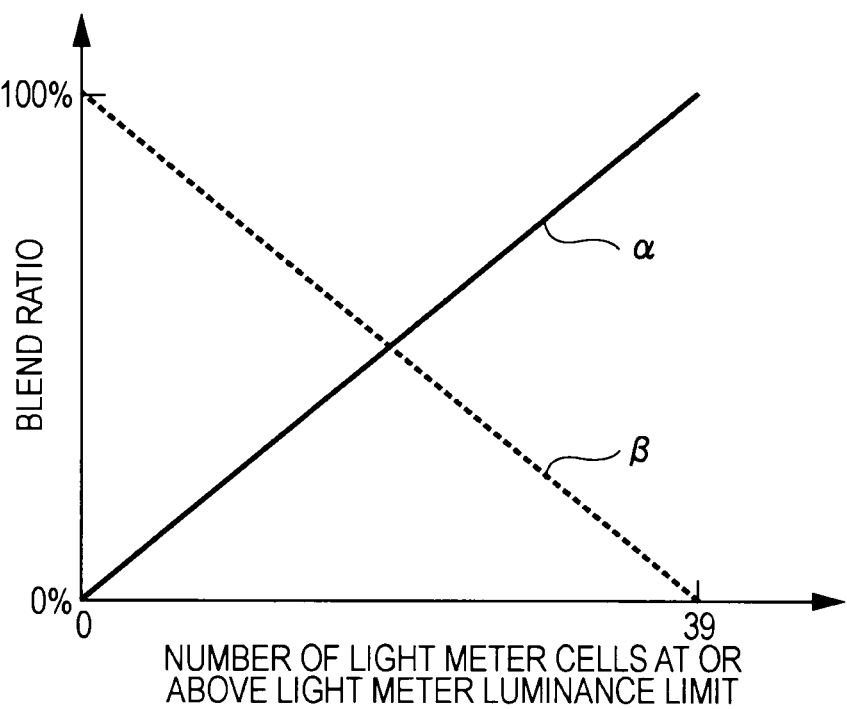
FIG. 16 is a graph illustrating the relationship between the number of light meter cells at or above the light meter luminance limit, and the blend ratios.

In the graph shown in FIG. 16, the blend ratio α (i.e., the coefficient of the measured luminance range Bmes in the above Eq. 10) increases proportionally to the number of small cells Ef at or above the light meter luminance limit, and is made to reach 100% when all (herein, 39) small cells Ef are at or above the light meter luminance limit. Meanwhile, the blend ratio β (i.e., the coefficient of the prescribed luminance range Bset in the above Eq. 10) is varied so as to maintain the relationship α+β=1, even when the number of light meter cells Ef at or above the light meter luminance limit changes. The blend ratios α and β are thus varied in accordance with the number of light meter cells (i.e., small cells) Ef at or above the light meter luminance limit, as shown in FIG. 16. By using these blend ratios α and β in the imaging apparatus 1G, it becomes possible to calculate a suitable blend (i.e., a weighted average) of the measured luminance range Bmes and the prescribed luminance range Bset. If the blend ratios α and β are set as shown in the graph in FIG. 16, then in the weighted average calculation expressed by Eq. 10, the weight of the measured luminance range (i.e., the range of luminance with respect to the subject) Bmes detected by the light meter 45 is increased with respect to the prescribed luminance range Bset as the number of light meter cells (i.e., small cells) Ef having a light meter value at or above the light meter luminance limit increases. Meanwhile, the weight of the measured luminance range Bmes detected by the light meter 45 is decreased with respect to the prescribed luminance range Bset as the number of light meter cells Ef at or above the light meter luminance limit decreases. As a result, it becomes possible to derive a reliable subject luminance range (i.e., the final luminance range Bcon), even when light metering a low-light subject with the light meter element 440.

The specific operation of such an imaging apparatus 1G is described hereinafter.

[Operation of Imaging Apparatus 1G]

Figure 17:
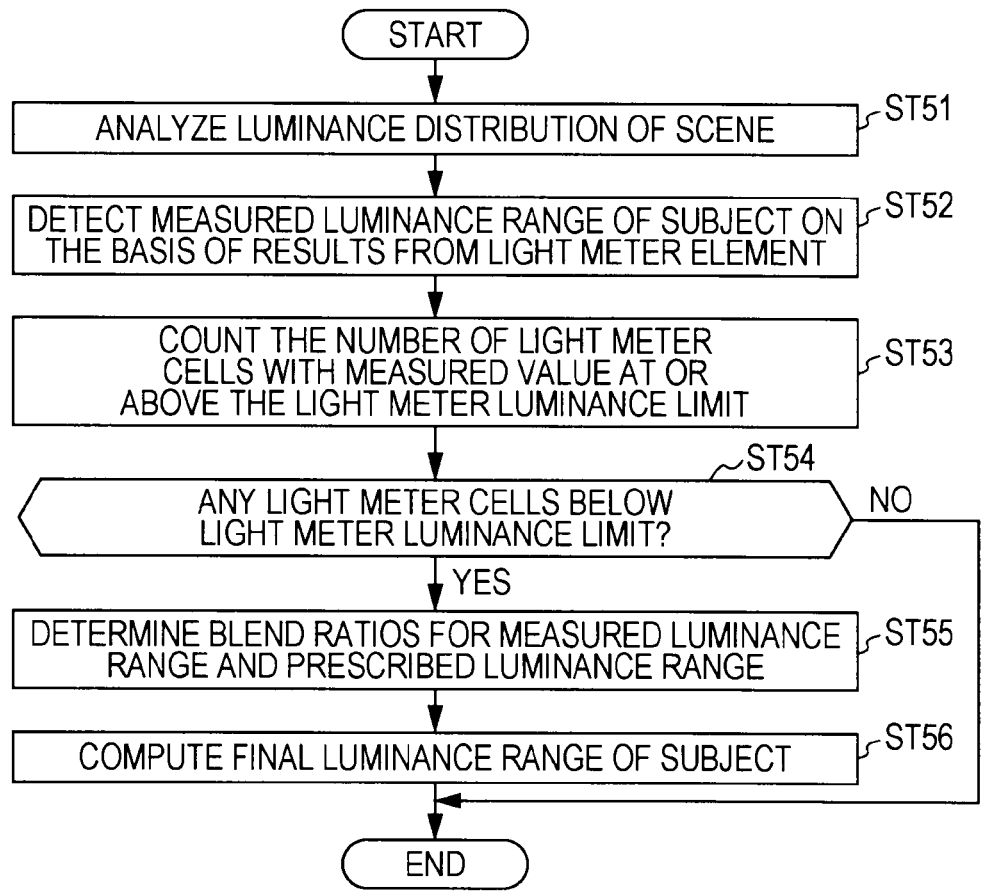
FIG. 17 is a flowchart illustrating the basic operation of an imaging apparatus in accordance with the seventh embodiment.

FIG. 17 is a flowchart illustrating the basic operation of the imaging apparatus 1G. More particularly, FIG. 17 shows the operation for detecting the luminance range of the subject using the light meter element 440. The operation shown in FIG. 17 is executed by the master controller 101G.

In step ST51, the luminance distribution of the scene corresponding to the subject is analyzed. At this point, the maximum luminance value Bmax and the minimum luminance value Bmin of the subject are calculated on the basis of luminance information detected by the respective light meter cells Ef and Eg of the light meter element 440.

In step ST52, the measured luminance range Bmes expressing the luminance range of the subject is detected by the light meter 45 on the basis of measurement results (i.e., the subject's luminance information) obtained by the light meter element 440. In other words, the luminance range of the scene is detected on the basis of the light meter values (i.e., the maximum and minimum luminance values Bmax and Bmin) obtained by the respective light meter cells Ef of the light meter element 440. In this case, the measured luminance range Bmes may be detected from the light meter data of the 39 small cells Ef in the light meter element 440, or the measured luminance range Bmes may be detected from the light meter data of all light meter cells Ef and Eg, including the large cell Eg.

In step ST53, the number of light meter cells (i.e., small cells) Ef with a light meter value at or above the light meter luminance limit in the light meter element 440 is counted. In other words, among the 39 small cells Ef, the number of small cells Ef having a light meter value at or above the light meter luminance limit (i.e., threshold value) is detected.

In step ST54, it is determined from the results of the detection in step ST53 whether or not there are light meter cells (i.e., small cells) Ef under the light meter luminance limit. In other words, it is determined whether or not there exists at least one small cell Ef having a light meter value less than the light meter luminance limit. At this point, if a small cell Ef under the light meter luminance limit is detected, then the process proceeds to step ST55 and the subject is treated as a low-light subject. In contrast, if a small cell Ef under the light meter luminance limit is not detected, then the present process flow is skipped. In this case, the subject can be determined to not be a low-light subject. For this reason, the light meter values detected by the light meter element 440 are not treated as unreliable, and the measured luminance range Bmes detected in step ST52 is set as the final luminance range Bcon of the subject.

In step ST55, the graph shown in FIG. 16 is referenced, and the blend ratios α and β for the measured luminance range Bmes and the prescribed luminance range Bset are determined in accordance with the number, obtained in step ST53, of light meter cells Ef at or above the light meter luminance limit.

In step T56, the blend ratios α and β determined in step ST55 are substituted into the above Eq. 10, and the final luminance range Bcon is computed. Subsequently, by substituting the final luminance range Bcon thus computed into Eq. 6 as the luminance range (Bmax-Bmin) of the subject, a suitable exposure step ΔB is obtained.

In the above steps ST54 to ST56, when it is determined on the basis of the detection results obtained in step ST53 that there exists a light meter cell Ef with a light meter value under the light meter luminance limit, blend ratios (i.e., weighting coefficients) α and β are set according to the number of light meter cells Ef at or above the light meter luminance limit detected in step ST53. Using these blend ratios α and β, the weighted computation in Eq. 10 is conducted with respect to the measured luminance range (i.e., the subject's luminance range) Bmes detected in step ST52 and the prescribed luminance range (i.e., a given luminance range) Bset. The result of this computation is set as the final luminance range (i.e., the subject's luminance range) Bcon. In so doing, it becomes possible to precisely derive the subject's luminance range, even when light metering a low-light subject with the light meter element 440.

Subsequently, the final luminance range Bcon set as the subject's luminance range (Bmax-Bmin) in step S56 is multiplied by the coefficient k to obtain a value corresponding to the exposure step ΔB (see Eq. 6). A range of exposure control values are then set having the exposure step ΔB. As a result, if multiple shots are taken at the respective exposure values set within this exposure control value range and subsequently composited, a composite image with a suitably expanded dynamic range can be generated.

In the imaging apparatus 1G described above, the number of light meter cells Ef with a light meter value at or above the light meter luminance limit is counted for low-light scenes that cause inaccuracies in the light meter element 440. Blend ratios α and β for the measured luminance range Bmes and the prescribed luminance range Bset in Eq. 10 are then set in accordance with the counted number of light meter cells Ef. For this reason, a reliably final luminance range Bcon can be computed. As a result, it becomes possible to set suitable exposure control values when taking multiple shots in order to generate a composite image.

<Eighth Embodim>

An imaging apparatus 1H in accordance with an eighth embodiment of the present invention has a similar configuration to that of the imaging apparatus 1G of the seventh embodiment, but differs in the configuration of the master controller.

In other words, the master controller 101H of the eighth embodiment stores in ROM a program that executes the operation of the imaging apparatus 1H described hereinafter.

[Detection of Subject's Luminance Range Using Light Meter Element 440]

In the imaging apparatus 1H, blend ratios are determined with consideration for the absolute luminance of the scene (hereinafter also referred to as the absolute scene luminance), in addition to the above-described blend ratios $\alpha$ and $\beta$ that are determined in accordance with the number of light meter cells (i.e., small cells) Ef at or above the light meter luminance limit. In so doing, finer blend ratio control becomes possible. Herein, the absolute scene luminance is taken to be the average of the light meter values obtained by each of the light meter cells Ef and Eg in the light meter element 440. In other words, the subject's average luminance is used by way of example as the absolute scene luminance herein.

A specific technique for computing the final luminance range of the subject will now be described. In the present embodiment, a blend ratio $\gamma$ is first computed by conducting a weighted average using the following Eq. 11. The subject's final luminance range Bcon is then computed from the measured luminance range Bmes and the prescribed luminance range Bset by substituting the blend ratio $\gamma$ into the following Eq. 12.

$$\gamma = p \times \alpha + (1-p) \times \beta \quad (11)$$

$$Bcon = \gamma \times Bmes + (1-\gamma) \times Bset \quad (12)$$

Figure 18:
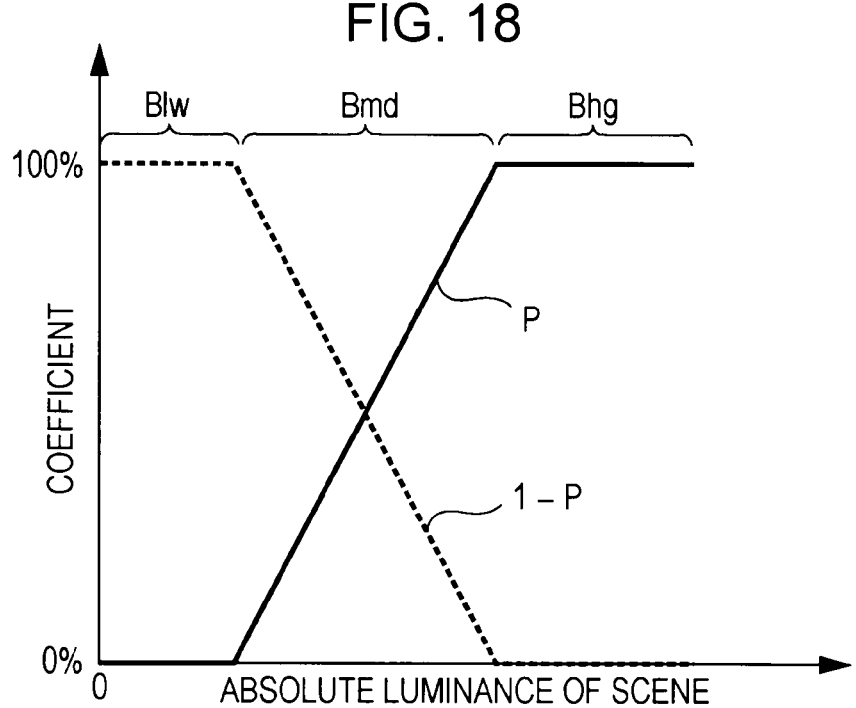
FIG. 18 is a graph illustrating the relationship between the absolute luminance of a scene and the coefficient used for weighted computation in an imaging apparatus in accordance with an eighth embodiment of the present invention.

The coefficients p and (1−p) in Eq. 11 vary in accordance with the graph shown in FIG. 18. In the graph shown in FIG. 18, the horizontal axis indicates the absolute luminance of the scene, while the vertical axis indicates the coefficient p in Eq. 11.

As shown by the graph in FIG. 18, the coefficient p used to calculate the weighted average of the blend ratios $\alpha$ and $\beta$ in Eq. 11 is fixed at 0% in the case where the absolute scene luminance falls within the low-intensity range Blw, and 100% in the case where the absolute scene luminance falls within the high-intensity range Bhg. In the case where the absolute scene luminance falls within the intermediate brightness range Bmd between the above ranges, the coefficient p is varied proportionally to the absolute scene luminance. In so doing, in the imaging apparatus 1H, the blend ratios $\gamma$ and (1−$\gamma$) related to the measured luminance range Bmes and the prescribed luminance range Bset can be determined while also taking the absolute scene luminance into account. For this reason, it becomes possible to more accurately set the blend ratio $\gamma$ and compute an optimal final luminance range Bcon of the subject.

The specific operation of such an imaging apparatus 1H is described hereinafter.

[Operation of Imaging Apparatus 1H]

Figure 19:
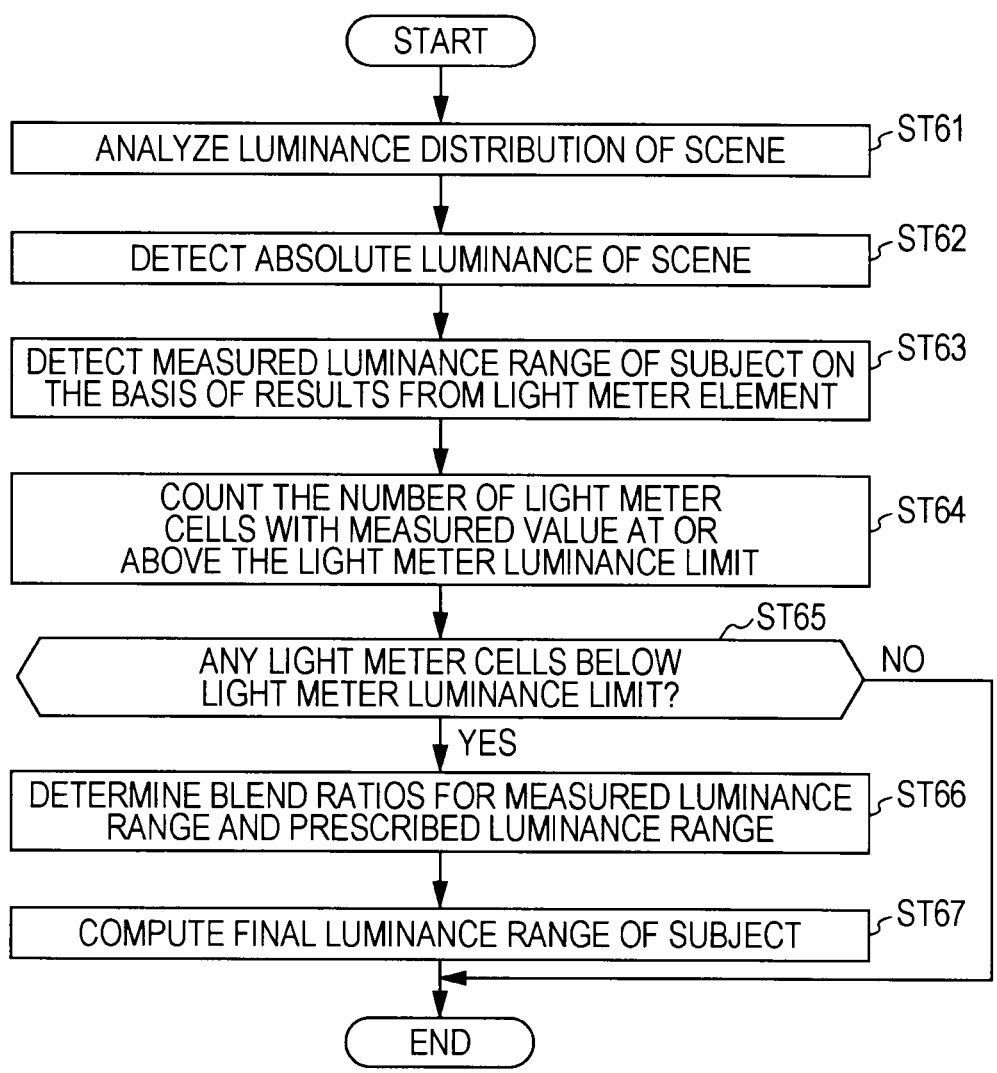
FIG. 19 is a flowchart illustrating the basic operation of an imaging apparatus in accordance with the eighth embodiment.

FIG. 19 is a flowchart illustrating the basic operation of the imaging apparatus 1H. More particularly, FIG. 19 shows the operation for detecting the luminance range of the subject using the light meter element 440. The operation shown in FIG. 19 is executed by the master controller 101H.

In step ST61, the luminance distribution of the scene corresponding to the subject is analyzed using the light meter element 440, similarly to step ST51 of the flowchart shown in FIG. 17.

In step ST62, the absolute luminance of the scene is detected. For example, the absolute scene luminance may be calculated as the average of the light meter values obtained by the respective light meter cells Ef and Eg of the light meter element 440.

In steps ST63 to ST65, operation is conducted similar to that of steps ST52 to ST54 of the flowchart shown in FIG. 17.

In step ST66, the graph in FIG. 16 is referenced to determine the blend ratios $\alpha$ and $\beta$ for the measured luminance range Bmes and the prescribed luminance range Bset according to the number, detected in step ST64, of light meter cells Ef at or above the light meter luminance limit. In addition, the graph in FIG. 18 is referenced to determine the coefficient p in accordance with the absolute luminance of the scene detected in step ST62. The blend ratios $\alpha$ and $\beta$ as well as the coefficient p are then substituted into Eq. 11 to compute the blend ratio $\gamma$.

In step ST67, the blend ratio $\gamma$ that was determined in step ST66 is substituted into Eq. 12 to compute the final luminance range Bcon of the subject. Thus, the blend ratio (i.e., weighting coefficient) $\gamma$ is set in the weighted computation of Eq. 12 in accordance with the number of light meter cells Ef at or above the light meter luminance limit detected in step ST64, as well as the absolute scene luminance (i.e., the subject's luminance value) detected in step ST62. Doing so makes it possible to achieve significantly finer control over the blend ratio $\gamma$, and to favorably and precisely derive the luminance range of the subject, even when light metering a low-light subject by means of the light meter element 440.

In the imaging apparatus 1H described above, advantages similar to those of the seventh embodiment are achieved. Furthermore, as demonstrated by Eq. 11 and FIG. 18, the blend ratio $\gamma$ in the imaging apparatus 1H is set on the basis of the absolute scene luminance in addition to the number of light meter cells Ef at or above the light meter luminance limit. For this reason, more suitable exposure control can be conducted when taking multiple shots in order to generate a composite image.

In the imaging apparatus 1H herein, the blend ratio $\gamma$ is computed by varying the coefficient p used in the weighted computation of Eq. 11 according to the absolute scene luminance as shown by the graph shown in FIG. 18. However, an embodiment of the present invention is not limited thereto, and the blend ratio $\gamma$ may also be computed by fixing the coefficient p to a value irrespective of the absolute scene luminance, such as 0.5, and then calculating a simple average.

<Modifications>

In the foregoing embodiments, the coefficient k expressed in Eqs. 1, 2, and 6 is not limited to being set to a fixed value such as 0.5. Instead, the coefficient k may be varied within the range from 0 to 1, in accordance with factors such as the luminance range of the subject and the maximum and minimum luminance values Bmax and Bmin.

In the foregoing embodiments, the difference between the maximum luminance value Bmax and the minimum luminance value Bmin is detected as the luminance range of the subject. However, an embodiment of the present invention is not limited thereto, and another value may be detected as the luminance range of the subject, such as the difference between a high-intensity average (for example, the average of values in a predetermined range ($\beta$% of all pixels) that starts at the maximum luminance value Bmax and extends in the direction of decreasing luminance) and a low-intensity average (for example, the average of values in a predetermined range ($\beta$% of all pixels) that starts at the minimum luminance value Bmin and extends in the direction of increasing luminance).

In the seventh and eighth embodiments, the light meter area Eu is not limited to being split into 40 zones like that of the light meter element 440 shown in FIG. 14, and instead the number of set zones may be 39 or less, or 41 or more.

The foregoing thus describes the present invention in detail, but it should be understood that the foregoing description is exemplary in all embodiments, and that the present invention is not to be limited thereto. It should be understood that innumerable modifications not shown herein may be made without departing from the scope of the present invention.

The present application contains subject matter related to that disclosed in Japanese Priority Patent Application JP 2009-134151 filed in the Japan Patent Office on Jun. 3, 2009, and in Japanese Priority Patent Application JP 2009-176202 filed in the Japan Patent Office on Jul. 29, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
   imaging means configured to receive subject light passing through imaging optics having an aperture mechanism, and generate an acquired image corresponding to a subject;
   luminance information acquiring means configured to meter a predetermined light meter area and acquire luminance information regarding the subject;
   detecting means configured to detect a luminance range of the subject on the basis of high-intensity luminance information and low-intensity luminance information acquired by the luminance information acquiring means;
   imaging controlling means configured to set a range of exposure control values having an exposure step that corresponds to a value obtained by multiplying the luminance range detected by the detecting means by a predetermined coefficient k, where 0<k<1, and then use the imaging means to take multiple shots set with respectively different exposure control values within the range of exposure control values; and
   image compositing means configured to generate a composite image by compositing image portions extracted from the plurality of images obtained as a result of the imaging means taking the multiple shots;
   wherein
   when just one shot is taken, a single exposure control value set for the one shot is contained within the range of the exposure control values.

2. The imaging apparatus according to claim 1, wherein the single exposure control value is a suitable exposure value calculated by predetermined exposure computations on the basis of the luminance information acquired by the luminance information acquiring means, and the imaging controlling means includes
   aperture value setting means configured to compute an aperture value in accordance with the single exposure control value from a program line chart defining a relationship between exposure times for the imaging means and aperture values for the aperture mechanism, and then to set the computed aperture value as a reference aperture value that is kept constant for the multiple shots, and
   exposure time setting means configured to set respective exposure times for the multiple shots on the basis of each exposure control value and the reference aperture value.

3. The imaging apparatus according to claim 1, further comprising:
   inputting means configured to receive user input; and
   specifying means configured to specify an aperture value for the aperture mechanism on the basis of the user input made with respect to the inputting means;
   wherein
   the imaging controlling means includes
   aperture value setting means configured to set the aperture value specified by the specifying means as a reference aperture value that is kept constant for the multiple shots, and
   exposure time setting means configured to set respective exposure times for the multiple shots on the basis of each exposure control value and the reference aperture value.

4. The imaging apparatus according to claim 1, further comprising:
   inputting means configured to receive user input; and
   specifying means configured to specify an exposure time for the imaging means on the basis of the user input made with respect to the inputting means;
   wherein
   the imaging controlling means includes
   aperture value setting means configured to compute an aperture value in accordance with an exposure time specified by the specifying means and corresponding to the exposure control value that obtains a brightest image from among the respective exposure control values, and then to set the computed aperture value as a reference aperture value that is kept constant for the multiple shots, and
   exposure time setting means configured to set respective exposure times for the multiple shots on the basis of each exposure control value and the reference aperture value.

5. The imaging apparatus according to claim 1, further comprising:
   inputting means configured to receive user input; and
   specifying means configured to specify an aperture value for the aperture mechanism and an exposure time for the imaging means on the basis of the user input made with respect to the inputting means;
   wherein
   the imaging controlling means includes
   means configured to set the exposure control value obtained from the aperture value and exposure time specified by the specifying means as the exposure control value that obtains a brightest image from among the respective exposure control values,
   aperture value setting means configured to set the aperture value specified by the specifying means as a reference aperture value that is kept constant for the multiple shots, and
   exposure time setting means configured to set respective exposure times for the multiple shots on the basis of each exposure control value and the reference aperture value.

6. The imaging apparatus according to claim 1, wherein the luminance information acquiring means includes
   spot metering means configured to conduct concentrated light metering of a specific spot zone in the predetermined light meter area, and
the imaging controlling means includes
means configured to set the single exposure control value equal to a suitable exposure value calculated by predetermined exposure computations on the basis of luminance information acquired by the spot metering means.

7. The imaging means according to claim 1, wherein the number of the multiple shots taken is three or more, and
the three or more shots include a shot taken at a suitable exposure value calculated by predetermined exposure computations on the basis of luminance information acquired by the luminance information acquiring means.

8. The imaging apparatus according to claim 1, wherein the luminance information acquiring means includes
light metering means provided with a predetermined number of light meter cells that segment and measure light in the predetermined light meter area, with the light metering means being able to output light meter values from each of the predetermined number of light meter cells as the luminance information of the subject,
the detecting means includes
luminance range detecting means configured to detect the luminance range of the subject on the basis of the subject's luminance information obtained by the light metering means,
cell number detecting means configured to detect, from among the predetermined number of light meter cells, the number of light meter cells having a light meter value equal to or greater than a predetermined threshold value,
and
luminance range setting means configured such that, in the case where it is determined on the basis of the detection results of the cell number detecting means that there exists a light meter cell having a light meter value less than the predetermined threshold value, weighted computation is conducted with respect to the luminance range detected by the luminance range detecting means and a predetermined luminance range using weighting coefficients set according to the number of light meter cells detected by the cell number detecting means, and the result of the weighted computation is then set as the luminance range of the subject,
and wherein
in the imaging controlling means, a range of exposure control values is set having a step that corresponds to the value obtained by multiplying the luminance range set by the luminance range setting means by the predetermined coefficient k.

9. The imaging apparatus according to claim 8, wherein in the weighted computation, the weight of the luminance range detected by the luminance range detecting means is increased with respect to the predetermined luminance range as the number of light meter cells detected by the cell number detecting means increases, whereas the weight of the luminance range detected by the luminance range detecting means is decreased with respect to the predetermined luminance range as the number of light meter cells detected by the cell number detecting means decreases.

10. The imaging apparatus according to claim 8, wherein
in the weighted computation, the weighting coefficients are set according to the number of light meter cells detected by the cell number detecting means, and the subject's luminance values obtained by the light metering means.

11. An imaging control method, comprising the steps of:
detecting a luminance range of a subject on the basis of high-intensity luminance information and low-intensity luminance information obtained by luminance information acquiring means configured to receive light in a predetermined light meter area and acquire luminance information regarding the subject; and
controlling imaging by setting a range of exposure control values having an exposure step that corresponds to a value obtained by multiplying the luminance range detected in the detecting step by a predetermined coefficient k, where $0<k<1$, and, by using imaging means configured to receive subject light passing through imaging optics having an aperture mechanism and generate an acquired image corresponding to the subject, taking multiple shots set with respectively different exposure control values within the range of exposure control values;
wherein
a composite image is generated by compositing image portions extracted from the plurality of images obtained as a result of the imaging means taking the multiple shots, and
when just one shot is taken, the single exposure control value set for the one shot is contained within the range of the exposure control values.

12. An imaging apparatus, comprising:
an imaging unit configured to receive subject light passing through imaging optics having an aperture mechanism, and generate an acquired image corresponding to a subject;
a luminance information acquirer configured to meter a predetermined light meter area and acquire luminance information regarding the subject;
a detector configured to detect a luminance range of the subject on the basis of high-intensity luminance information and low-intensity luminance information acquired by the luminance information acquirer;
an imaging controller configured to set a range of exposure control values having an exposure step that corresponds to a value obtained by multiplying the luminance range detected by the detector by a predetermined coefficient k, where $0<k<1$, and then use the imaging unit to take multiple shots set with respectively different exposure control values within the range of exposure control values; and
an image compositor configured to generate a composite image by compositing image portions extracted from the plurality of images obtained as a result of the imaging unit taking the multiple shots;
wherein
when just one shot is taken, a single exposure control value set for the one shot is contained within the range of the exposure control values.

\* \* \* \* \*